(12) United States Patent
Rowe et al.

(10) Patent No.: US 9,958,075 B2
(45) Date of Patent: May 1, 2018

(54) WATER TAP BODY AND INSTALLATION

(71) Applicant: Greg Rowe Limited, Norwich (GB)

(72) Inventors: Gregory Stephen Rowe, Norwich (GB); Gregory Norman Rowe, Norwich (GB)

(73) Assignee: GREG ROWE LIMITED, Norwich (GB)

( * ) Notice: Subject to any disclaimer, the term of this patent is extended or adjusted under 35 U.S.C. 154(b) by 0 days. days.

(21) Appl. No.: 14/837,640

(22) Filed: Aug. 27, 2015

(65) Prior Publication Data
US 2016/0061338 A1 Mar. 3, 2016

(30) Foreign Application Priority Data
Aug. 28, 2014 (GB) .................................. 1415261.5

(51) Int. Cl.
| | | |
|---|---|---|
| F16K 11/078 | (2006.01) | |
| F16K 35/02 | (2006.01) | |
| F16K 11/20 | (2006.01) | |
| F16K 11/00 | (2006.01) | |
| E03C 1/04 | (2006.01) | |

(52) U.S. Cl.
CPC .......... *F16K 11/078* (2013.01); *F16K 11/207* (2013.01); *F16K 19/006* (2013.01); *F16K 35/025* (2013.01); *E03C 1/0411* (2013.01); *E03C 2201/30* (2013.01); *Y10T 137/86493* (2015.04); *Y10T 137/86549* (2015.04)

(58) Field of Classification Search
CPC ...... F16K 11/078; F16K 11/207; F16K 19/06; F16K 35/025
See application file for complete search history.

(56) References Cited

U.S. PATENT DOCUMENTS

| | | | | |
|---|---|---|---|---|
| 4,328,830 A | * | 5/1982 | Greer ................... | F16K 11/078 137/625.4 |
| 5,021,250 A | * | 6/1991 | Ferguson ................ | B67D 1/00 222/1 |
| 5,205,313 A | | 4/1993 | Moretti | |
| 5,293,901 A | * | 3/1994 | Guzzini ................... | E03C 1/04 137/595 |

(Continued)

FOREIGN PATENT DOCUMENTS

| | | |
|---|---|---|
| CN | 203421271 U | 2/2014 |
| DE | 102008006255 A1 | 8/2009 |

(Continued)

*Primary Examiner* — Craig Schneider
*Assistant Examiner* — Kevin Barss
(74) *Attorney, Agent, or Firm* — NSIP Law

(57) ABSTRACT

A water tap body has a mechanical mixing valve which is operable selectively to allow water to flow only from a first water inlet to a water outlet of the mixing valve, to allow water to flow only from a second water inlet to the water outlet, and to allow a mix of water to flow to the water outlet. The water tap body also has a mechanical selector valve which is operable selectively to allow water to flow only from a first water inlet to a water outlet and to allow water to flow only from a second water inlet to the water outlet of the mechanical selector valve. The water outlet of the mechanical mixing valve is in fluid communication with a first tap body outlet. The water outlet of the mechanical selector valve is in fluid communication with a second tap body outlet.

13 Claims, 14 Drawing Sheets

(56) References Cited

U.S. PATENT DOCUMENTS

| | | | |
|---|---|---|---|
| 5,417,348 A * | 5/1995 | Perrin | B67D 1/0059 137/606 |
| 2007/0028974 A1* | 2/2007 | Herring | E03C 1/04 137/636 |
| 2011/0030823 A1* | 2/2011 | Seal | E03C 1/04 137/603 |
| 2012/0168000 A1* | 7/2012 | Gioira | E03C 1/0404 137/334 |

FOREIGN PATENT DOCUMENTS

| | | |
|---|---|---|
| EP | 390121 A1 | 10/1990 |
| EP | 0577164 A1 | 1/1994 |
| EP | 2472150 A1 | 7/2012 |
| EP | 2672027 A1 | 12/2013 |
| WO | 2006072250 A1 | 7/2006 |

\* cited by examiner

WATER TAP BODY AND INSTALLATION

CROSS-REFERENCE TO RELATED APPLICATIONS

This application claims priority under 35 U.S.C. § 119(a) and 37 CFR § 1.55 to United Kingdom Patent Application No. 1415261.5, filed on Aug. 28, 2014, the entire contents of which are incorporated herein by reference.

BACKGROUND OF THE INVENTION

Field of the Invention

The present invention relates to a water tap body and to an installation of a water tap body in a surface.

Description of the Related Technology

Taps (or "faucets") that supply water from multiple sources are growing in popularity. There are, for example, now a number of "three-way" taps on the market which supply water from hot and cold mains water sources, and also water from a third source, such as a filtered water source or a chilled water source.

One such "three-way" tap is described in WO-A-1991/07614. The three-way tap includes first and second valves, which are operable via respective handles to control the flow of water from hot and cold mains sources, and a third valve, which is operable via a third handle to control the flow of filtered water from a filtered water source.

Moreover, many taps in the literature and on the market have electronically controlled valves and metering arrangements, which are complicated and expensive to install and maintain or service.

SUMMARY

In a first exemplary embodiment of the invention, there is provided a water tap body comprising: a mechanical mixing valve having a first water inlet, a second water inlet and a water outlet, the mechanical mixing valve being operable selectively to allow water to flow only from the first water inlet to the water outlet, to allow water to flow only from the second water inlet to the water outlet, and to allow a mix of water to flow from the first water inlet and the second water inlet to the water outlet;

a mechanical selector valve having a first water inlet, a second water inlet and a water outlet, the mechanical selector valve being operable selectively to allow water to flow only from the first water inlet to the water outlet and to allow water to flow only from the second water inlet to the water outlet; and a first tap body outlet and a second tap body outlet; the water outlet of the mechanical mixing valve being in fluid communication with the first tap body outlet such that water passing out of the water outlet of the mechanical mixing valve passes to the first tap body outlet; and the water outlet of the mechanical selector valve being in fluid communication with the second tap body outlet such that water passing out of the water outlet of the mechanical selector valve passes to the second tap body outlet.

In a second exemplary embodiment of the invention, there is provided an installation of a water tap body in a surface, the water tap body comprising: a mechanical mixing valve having a first water inlet, a second water inlet and a water outlet, the mechanical mixing valve being operable selectively to allow water to flow only from the first water inlet to the water outlet, to allow water to flow only from the second water inlet to the water outlet, and to allow a mix of water to flow from the first water inlet and the second water inlet to the water outlet; a mechanical selector valve having a first water inlet, a second water inlet and a water outlet, the mechanical selector valve being operable selectively to allow water to flow only from the first water inlet to the water outlet and to allow water to flow only from the second water inlet to the water outlet; and a spout, the spout comprising a first water channel having an inlet in fluid communication with the water outlet of the mechanical mixing valve, the spout comprising a second water channel having an inlet in fluid communication with the water outlet of the mechanical selector valve; wherein the mechanical mixing valve, the mechanical selector valve and the spout are all located on the same side of the surface; and wherein all components of the tap body are mechanical.

Further features and advantages of the invention will become apparent from the following description of preferred embodiments of the invention, given by way of example only, which is made with reference to the accompanying drawings.

Figure 1:
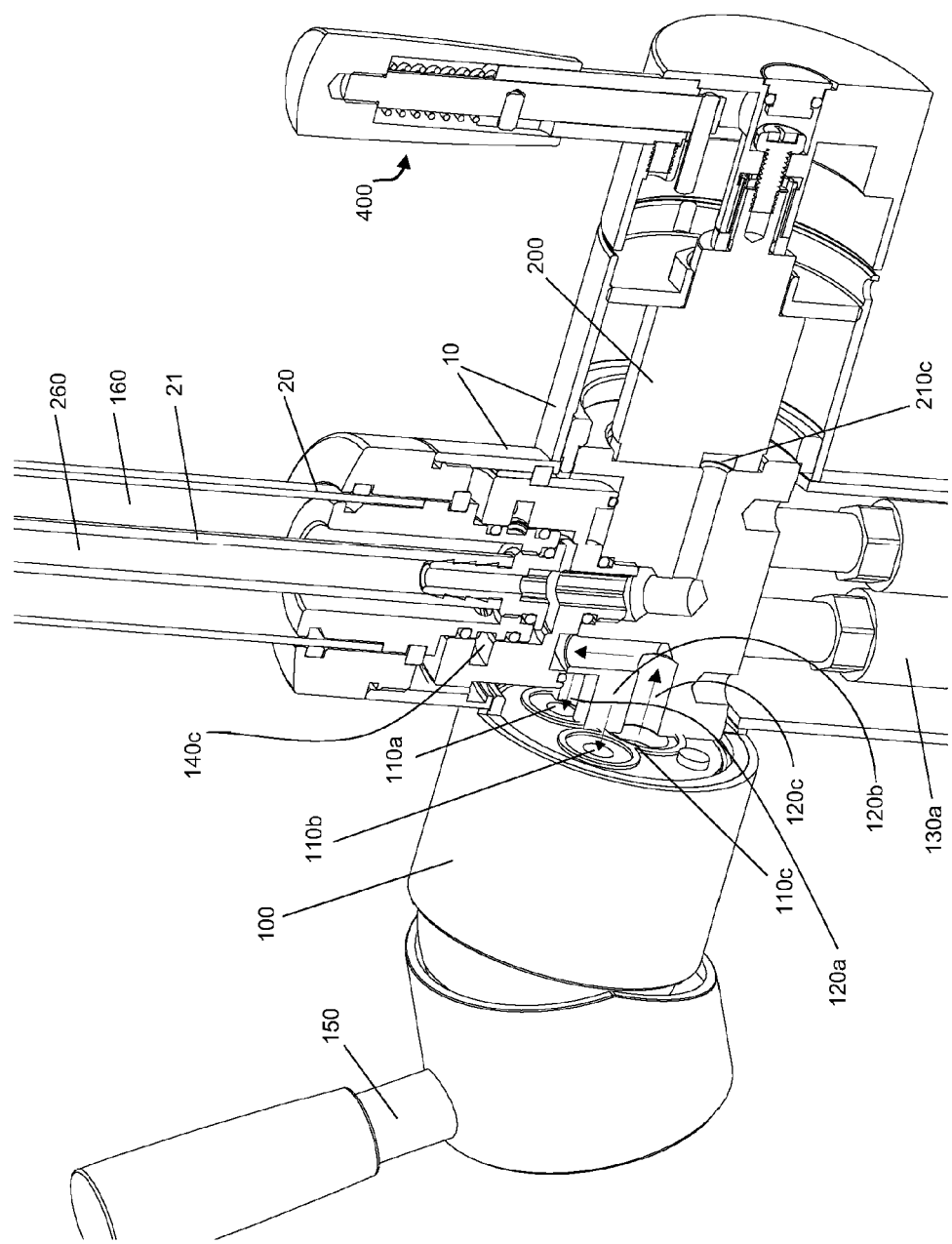
FIG. 1 shows a partially sectioned/phantom perspective view from one side of an example of a water tap body according to an embodiment of the present invention in a first operating configuration.

In examples of embodiments of the present invention, the water tap body is fixable or attachable to a surface, such as a work surface of a kitchen, a surface of a sink, etc. The water tap body may be arranged such that, when the water tap body is installed on the surface, the mechanical mixing valve, the mechanical selector valve and the first and second tap body outlets are all located on the same side of the surface, which in practice is typically an uppermost surface. By locating the entirety of the mechanical mixing and mechanical selector valves in particular on the same (uppermost) side of the surface as the first and second tap body outlets, the user has easy access to the valves. This simplifies installation of the water tap body and is also useful in the event that the valves need to be repaired or maintained or replaced even. In examples of embodiments of the present invention, all components of the water tap body are mechanical. This has the advantage that no electrical components or electronics or the like need to be installed when the water tap body is first installed onto a surface, making installation and maintenance easier, as an electrician is not required to install the tap body and no wiring to electrical components or electronics or the like is required.

In an example embodiment, the tap body is arranged such that when the tap body is installed on a surface, the mechanical mixing valve, the mechanical selector valve and the first and second tap body outlets are all located on the same side of the surface.

In an example embodiment, the tap body comprises a first body part and a second body part, wherein the first and second body parts are separable components of the water tap body, and wherein the first body part is connectable to the mechanical mixing valve, the mechanical selector valve and the second tap body part. In an embodiment, the first body part comprises first, second, third, and fourth tap body inlet channels, which route water from respective inlets of the tap body to the first and second water inlets of the mechanical mixing valve and the first and second water inlets of the mechanical selector valve respectively, and the second body part comprises first and second outlet channels which route water to the first and second tap body outlets respectively. In an embodiment, the first body part comprises first and second outlet channels, the first outlet channel of the first body part routing water from the water outlet of the mechanical mixing valve to the first outlet channel of the second body part, and the second outlet channel of the first body part routing water from the water outlet of the mechanical selector valve to the second outlet channel of the second body part.

In an example embodiment, the tap body comprises a spout, the spout having a first water channel having an inlet in fluid communication with the water outlet of the mechanical mixing valve, and the spout having a second water channel having an inlet in fluid communication with the water outlet of the mechanical selector valve.

In an example embodiment, the mechanical mixing valve is manually operable to allow a selectively variable amount of water to flow from the first water inlet and the second water inlet into the mechanical mixing valve to mix in the mechanical mixing valve.

In an example embodiment, the mechanical selector valve is manually operable to move between first, second and third positions, the mechanical selector valve in the first position preventing flow of water through the first and second water inlets of the mechanical selector valve, the mechanical selector valve in the second position allowing water to flow only from the first water inlet of the mechanical selector valve to the water outlet of the mechanical selector valve, the mechanical selector valve in the third position allowing water to flow only from the second water inlet of the mechanical selector valve to the water outlet of the mechanical selector valve.

In an example embodiment, the mechanical mixing valve comprises a manually operable lever and the mechanical selector valve comprises a manually operable lever.

In another example embodiment, the tap body comprises a first body part and a second body part, wherein the first and second body parts are separable components of the water tap body, and wherein the first body part comprises first and second ports for receiving the mechanical mixing valve and the mechanical selector valve respectively, and wherein the first body part is connectable to the second tap body part. In an embodiment, the first body part comprises first, second, third, and fourth tap body inlet channels, which route water from respective tap body inlets to the first and second water inlets of the mechanical mixing valve and the first and second water inlets of the mechanical selector valve respectively, and the second body part comprises first and second outlet channels which route water to the first and second water channels of the spout respectively. In an embodiment, the first body part comprises first and second outlet channels, the first outlet channel of the first body part routing water from the water outlet of the mechanical mixing valve to the first outlet channel of the second body part, and the second outlet channel of the first body part routing water from the water outlet of the mechanical selector valve to the second outlet channel of the second body part.

In another example embodiment, the mechanical mixing valve is manually operable to allow a selectively variable amount of water to flow from the first water inlet and the second water inlet into the mechanical mixing valve to mix in the mechanical mixing valve.

In another example embodiment, the mechanical selector valve is manually operable to move between first, second and third positions, the mechanical selector valve in the first position preventing flow of water through the first and second water inlets of the mechanical selector valve, the mechanical selector valve in the second position allowing water to flow only from the first water inlet of the mechanical selector valve to the water outlet of the mechanical selector valve, the mechanical selector valve in the third position allowing water to flow only from the second water inlet of the mechanical selector valve to the water outlet of the mechanical selector valve.

In another example embodiment, the mechanical mixing valve comprises a manually operable lever and the mechanical selector valve comprises a manually operable lever.

Referring now to FIG. 1, there is shown a partially sectioned/phantom perspective view of an example of a water tap body 10 according to an embodiment of the present invention. The tap body 10 has a mechanical mixing valve 100 and a mechanical selector valve 200.

The mechanical mixing valve 100 has a first water inlet 110a, a second water inlet 110b and a water outlet 110c. The first water inlet 110a is, in one embodiment, in fluid communication with a first tap body inlet (not visible in FIG. 1 but generally at the lower end of the tap body 10). In the embodiment depicted in FIG. 1, the first tap body inlet is connected to the first water inlet 110a of the mechanical mixing valve 100 via a hollow channel which runs through the tap body 10 from the first tap body inlet to the first water inlet 110a of the mechanical mixing valve 100. The channel is partially shown in cutaway at 120a.

In use when the tap body 10 is installed in a work surface or the like, the first tap body inlet is in fluid communication with a first water source. The first water source may be for example a hot water supply, which delivers hot water under pressure to the first tap body inlet via one or more pipes or tubes, such as the pipe 130a.

The second water inlet 110b of the mechanical mixing valve 100 is, in one embodiment, in fluid communication with a second tap body inlet (again not visible in FIG. 1 but generally at the lower end of the tap body 10). Similarly to the first tap body inlet, the second tap body inlet is connected to the second water inlet 110b of the mechanical mixing valve 100 via a hollow channel (not visible in FIG. 1, but partially shown in cutaway at 120b of FIG. 3) which runs through the tap body 10 from the second tap body inlet to the second water inlet 110b of the mechanical mixing valve 100.

The second tap body inlet 110b may itself be in fluid communication with a second water source. The second water source may be for example a mains cold water supply, which delivers cold water under pressure to the second tap body inlet 110b via one or more pipes or tubes as described above for the first tap body inlet 110a. The channel 120a that connects the first tap body inlet and the first water inlet 110a of the mechanical mixing valve 100 is not connected to the channel 120b that connects the second tap body inlet to the second water inlet 110b of the mechanical mixing valve 100 other than via the mechanical mixing valve 100, so that water cannot flow directly from one of the inlet channels to the other. This prevents undesired mixing of the water from the two sources.

The water outlet 110c of the mechanical mixing valve 100 is in fluid communication with a first tap body outlet 140c of the tap body 10 such that water passing out of the water outlet 110c of the mechanical mixing valve 20 passes to the first tap body outlet 140c. In the embodiment depicted in FIG. 1, the water outlet 110c is connected to the first tap body outlet 140c via a mixed water outlet channel 120c, which runs through the tap body 10. The mixed water outlet channel 120c is not connected to the channel 120a that connects the first tap body inlet and the first water inlet 110a, nor the channel 120b that connects the second tap body inlet to the second water inlet 110b, other than via the mechanical mixing valve 100, such that water cannot flow directly from the mixed water outlet channel 120c to the other two channels 120a, 120b. This prevents undesired mixing of the water between the three channels 120a, 120b, 120c.

The mechanical mixing valve 100 is operable to selectively allow water to flow only from the first water inlet 110a to the water outlet 110c, to allow water to flow only from the second water inlet 110b to the water outlet 110c, and to allow a mix of water to flow from the first water inlet 110a and the second water inlet 110b to the water outlet 110c. Such mechanical mixing valves 100 are of particular advantage where the water sources supplying water to the first and second water inlets 110a, 110b are hot and cold mains water sources. In this case, the mechanical mixing valve 100 is operable to allow the temperature of the water at the water outlet 110c to be controlled by allowing either hot water, cold water, or a mix of hot and cold water, to flow to the water outlet 110c.

In one embodiment, the mechanical mixing valve 100 is manually operable to allow a selectively variable amount of water to flow through each of the first water inlet 110a and the second water inlet 110b into the mechanical mixing valve 100. In other words, the mechanical mixing valve 100 is manually operable to control the flow rate of water from the first water inlet 110a to the water outlet 110c and the flow rate of water from the second water inlet 110b to the water outlet 110c, whether the flow is a flow only from the first or second water inlets 110a, 110b or is a mixed flow.

The mechanical mixing valve 100 has a manually operable lever or arm 150. The arm 150 is operable to control the flow of water from each of the first and second water inlets 110a, 110b to the water outlet 110c of the mechanical mixing valve 100. In one example, the mechanical mixing valve 100 is coupled to the arm 150 such that pivoting or rotation of the arm 150 in one plane controls the proportion of water from the first and second water inlets 110a, 110b that is allowed to flow to the water outlet 110c, and pivoting or rotation of the arm 150 in a second plane perpendicular to the first plane controls the flow rate of the water through the first and second water inlets 110a, 110b thereby controlling the overall flow rate of the water at the water outlet 110c.

Mechanisms for mechanical mixing valves which operate as described above are known as such in the art. One example is a standard 35 mm ceramic disk cartridge valve, which includes a fixed disk and a movable disk. In this case, the first and second fluid inlets 110a, 110b and the fluid outlet 110c are effectively formed as openings within the fixed disk. Movement of the arm 150 causes a corresponding movement of the movable disk, which moves relative to the fixed disk to partially or completely obstruct or completely open the first and second fluid inlets 110a, 110b and thereby to control the rate of flow of water through each of the two inlets 110a, 110b and to the outlet 110c of the mechanical mixing valve 100.

Figure 2:
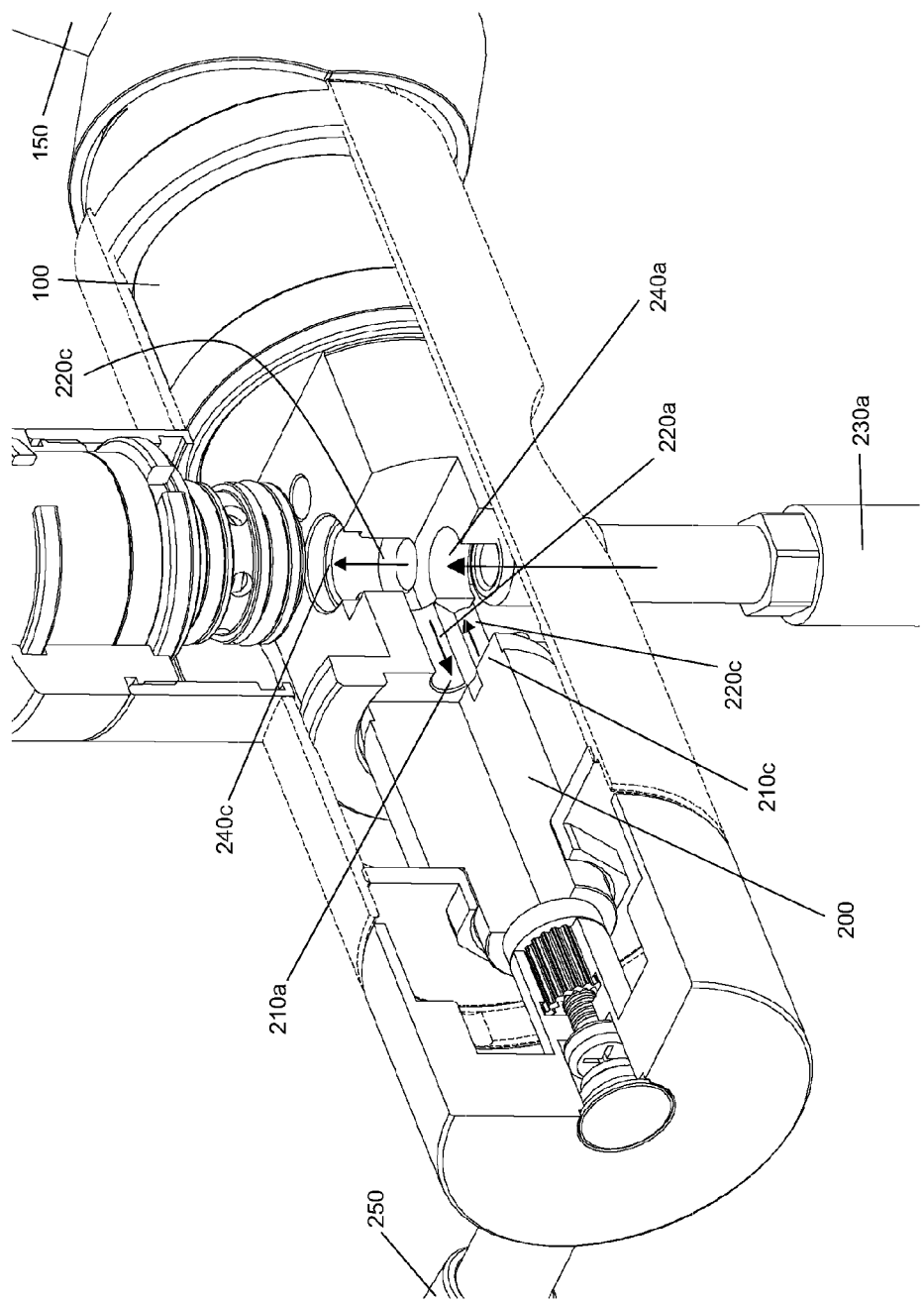
FIG. 2 shows a partially sectioned/phantom perspective view from another side of the water tap body of FIG. 1 in a second operating configuration.

As mentioned, the tap body 10 also comprises a mechanical selector valve 200, which, in this example, is positioned diametrically opposite the mechanical mixing valve 100. As shown in FIG. 2, the mechanical selector valve 200 comprises a first water inlet 210a, a second water inlet 210b and a water outlet 210c. The first water inlet 210a is, in one embodiment, in fluid communication with a third tap body inlet 240a. In the embodiment depicted in FIG. 2, the third tap body inlet 240a is connected to the first water inlet 210a of the mechanical selector valve 200 via a hollow channel which runs through the tap body 10 from the third tap body inlet 240a to the first water inlet 210a of the mechanical selector valve 200. The channel is partially shown in cutaway at 220a. The channel 220a connecting the third tap body inlet 240a and the first water inlet 210a is not connected to any of the other above-described inlet and outlet channels 110a, 110b, 110c running through the tap body 10. This prevents undesired mixing of the water in the different channels.

In use when the tap body 10 is installed in a work surface or the like, the third tap body inlet 240a is in fluid communication with a third water source. The third water source may be, for example, a hot or boiling filtered water source, which delivers hot or boiling filtered water under pressure to the third tap body inlet 130 via one or more pipes or tubes, such as the pipe 230a.

Figure 3:
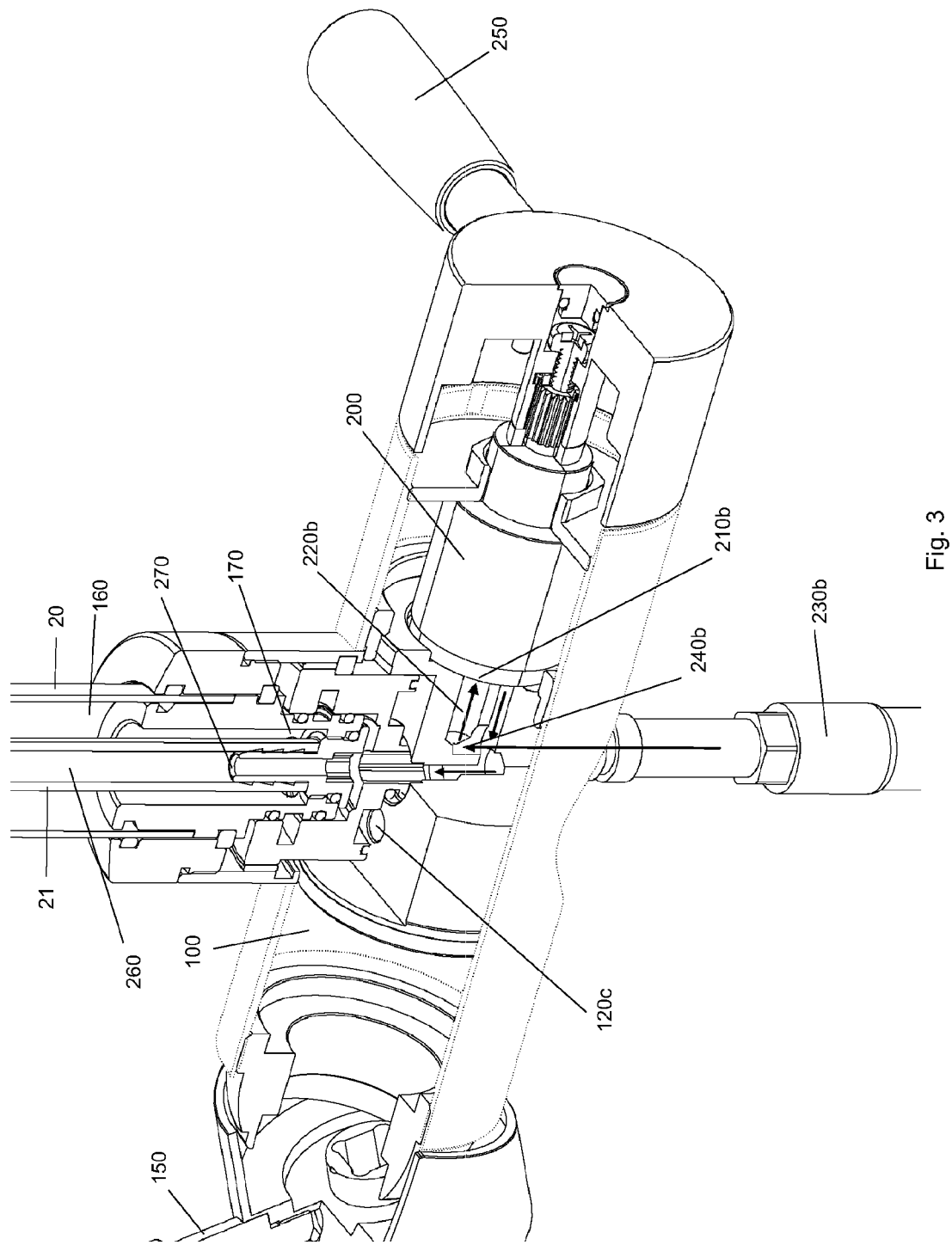
FIG. 3 shows a partially sectioned/phantom perspective view from the one side of the water tap body of FIG. 1 in a further operating configuration.

The second water inlet 210b of the mechanical selector valve 200 is, in one embodiment, in fluid communication with a fourth tap body inlet (shown at 240b in FIG. 3). Similarly to the third tap body inlet 240a, the fourth tap body inlet 240b is connected to the second water inlet 210b of the mechanical selector valve 200 via a hollow inlet channel (shown in cutaway at 220b in FIG. 3) which runs through the tap body 10 from the fourth tap body inlet 240b to the second water inlet 210b of the mechanical selector valve 200.

The channel 220b connecting the fourth tap body inlet 240b and the second water inlet 210b is not connected to any of the other above-described inlet and outlet channels 120a, 120b, 120c, 220a running through the tap body 10 other than via the mechanical selector valve 200. This prevents undesired mixing of the water in the different channels.

In use when the tap body 10 is installed in a work surface or the like, the fourth tap body inlet 240b is in fluid communication with a fourth water source. The fourth water source may be, for example, a cold filtered water source, which delivers cold filtered water under pressure to the fourth tap body inlet 135 via one or more pipes or tubes, such as the pipe 230b.

The water outlet 210c of the mechanical selector valve 200 is in fluid communication with a second tap body outlet 240c of the tap body 10 such that water passing out of the water outlet 210c of the mechanical selector valve 200 passes to the second tap body outlet 240c. In the arrangement depicted in FIG. 2, the water outlet 240c of the mechanical selector valve 200 is connected to the second tap body outlet 210c via a channel 220c, which runs through the tap body 10. The outlet channel 220c that connects the water outlet 210c of the mechanical selector valve 200 and the second tap body outlet 240c of the tap body 10 is not connected to any of the other above-described inlet and outlet channels 120a, 120b, 120c, 220a, 220b running through the tap body 10 other than via the mechanical selector valve 200. This prevents undesired mixing of the water in the different channels.

The mechanical selector valve 200 is operable selectively to allow water to flow only from the first water inlet 210a to the water outlet 210c of the mechanical selector valve 200, and to allow water to flow only from the second water inlet 210b to the water outlet 210c of the mechanical selector valve 200. Unlike the mechanical mixing valve 100, in this example the mechanical selector valve 200 is not operable to allow a mix of water to flow from the first water inlet 210a and the second water inlet 210b to the water outlet 210c. Instead, the mechanical selector valve 200 allows water to flow from only a single water inlet 210a or 210b to the water outlet 210c at any one time. Such mechanical selector valves 200 are of particular advantage where there is a desire to keep the water supplied to the first water inlet 210a separate from the water supplied to the second water inlet 210b. This may be the case, for example, where the water supplied to the first water inlet 210a is cold filtered water, and the water supplied to the second water inlet 210b is, for example, hot or boiling filtered water, or sparkling filtered water.

In one embodiment, the mechanical selector valve 200, or one or more components thereof, is manually operable to move between first, second and third positions, which may be rotary positions of the mechanical selector valve 200. In the first position (see FIG. 1 for example), the mechanical selector valve 200 prevents the flow of water through the first and second water inlets 210a, 210b of the mechanical selector valve 200. In the second position (see FIG. 2 for example), the mechanical selector valve 200 allows water to flow only from the first water inlet 210a of the mechanical selector valve 200 to the water outlet 210c of the mechanical selector valve 200. In the third position (see FIG. 3 for example), the mechanical selector valve 200 allows water to flow only from the second water inlet 210b of the mechanical selector valve 200 to the water outlet 210c of the mechanical selector valve 200. As a particular example, the mechanical selector valve 200 may be pivotable or rotatable between the first, second and third positions about an axis.

The mechanical selector valve 200 may be manually operable to move between additional positions, which may cause the valve to carry out additional functions, such as allowing water to flow from a further water inlet of the mechanical selector valve 200 to the water outlet 210c of the mechanical selector valve 200.

The "second position" and the "third position" may respectively comprise a range of positions. For example where the mechanical selector valve 200 is rotatable, the "second position" may include all orientations of the mechanical selector valve 200 between the first position and an orientation in which the mechanical selector valve 200 has been rotated by a maximum angle (such as for example 90° or 180°) from the first position. Similarly, the "second position" may include all orientations of the mechanical selector valve 200 between the first position and an orientation in which the mechanical selector valve 200 has been rotated by a maximum angle (such as for example 90° or 180°) in the opposite direction.

In one embodiment, the angle by which the mechanical selector valve 200 has been rotated may control the amount of water that the mechanical selector valve 200 allows to flow to the water outlet 210c of the mechanical selector valve 200. For example, where the "second position" comprises all orientations of the mechanical selector valve 200 between the first position and a 90° clockwise rotation from the first position, a rotation of 90° may cause the mechanical selector valve 200 to allow water to flow from the first water inlet 210b to the water outlet 210c at a higher rate of flow than when the mechanical selector valve 30 is at, for example, a 45° orientation.

The mechanical selector valve 200 has a manually operable lever or arm 250. The manually operable arm 250 is coupled to the mechanical selector valve 200 and is operable to cause the mechanical selector valve 200 to allow water to flow only from the first water inlet 210a of the mechanical selector valve 200 to the water outlet 210c of the mechanical selector valve 200, or to allow water to flow only from the second water inlet 210b of the mechanical selector valve 200 to the water outlet 210c of the mechanical selector valve 200, or to prevent the flow of water from both the first and second water inlets 210a, 210b of the mechanical selector valve 200 to the water outlet 210c of the mechanical selector valve 200. In particular, the arm 250 is in the orientation as shown in FIG. 1, flow of water from both the first and second water inlets 210a, 210b of the mechanical selector valve 200 to the water outlet 210c of the mechanical selector valve 200 is prevented. When the arm 250 is in the orientation as shown in FIG. 2, the mechanical selector valve 200 allows water to flow only from the first water inlet 210a of the mechanical selector valve 200 to the water outlet 210c of the mechanical selector valve 200. When the arm 250 is in the orientation shown in FIG. 3, the mechanical selector valve 200 allows water to flow only from the second water inlet 210b of the mechanical selector valve 200 to the water outlet 210c of the mechanical selector valve 200.

Figure 4:
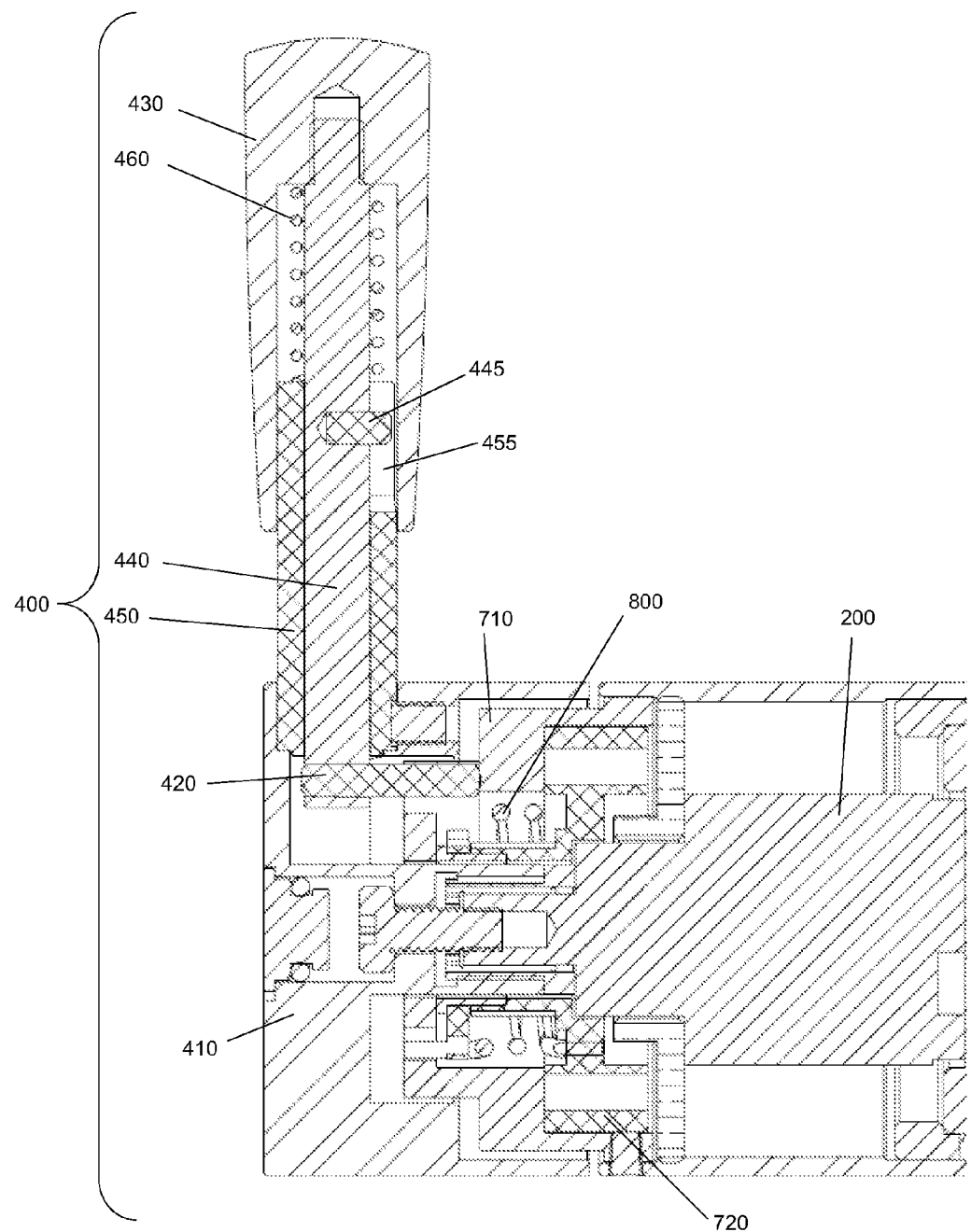
FIG. 4 shows a longitudinal cross-sectional view through a part of the tap body of FIG. 1.
Figure 5:
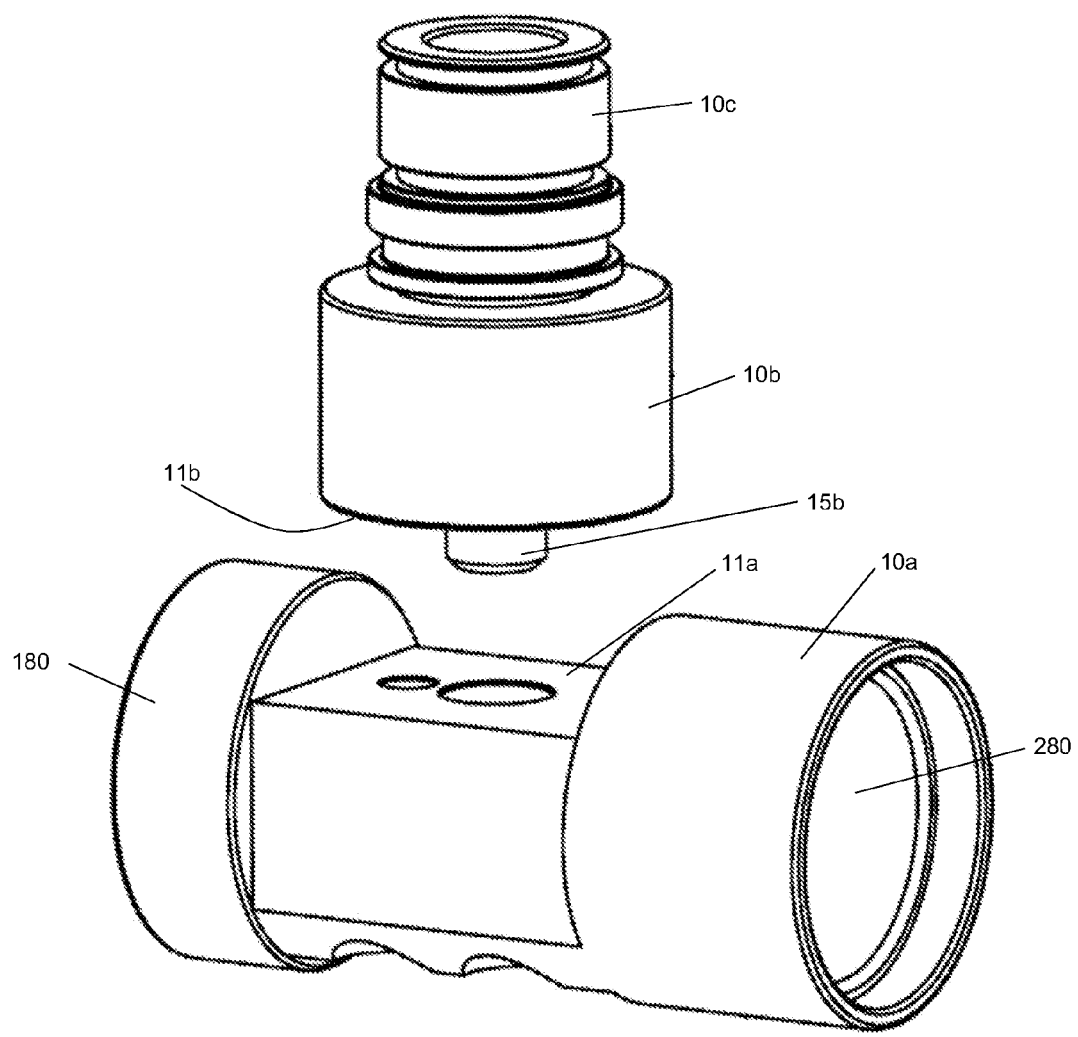
FIG. 5 shows an exploded perspective view of examples of first and second tap body parts according to an embodiment of the present invention.

As mentioned, the tap body 10 comprises a first tap body outlet 140c, which is in fluid communication with the water outlet 110c of the mechanical mixing valve 100, and a second tap body outlet 240c, which is in fluid communication with the water outlet 210c of the mechanical selector valve 200. In one embodiment, the first and second tap body outlets 140c, 240c may connect to or be formed as part of a spout 20, a lower part of which is shown in FIG. 4. In this example, the spout 20 comprises a first water channel 160 and a second water channel 260. The first water channel 160 has an inlet 170 in fluid communication with the water outlet 110c of the mechanical mixing valve 100. The second water channel 260 has an inlet 270 in fluid communication with the water outlet 210c of the mechanical selector valve 200.

In the particular arrangement shown in FIG. 1, the first water channel 160 and the second water channel 260 are coaxial channels which are separated by a wall 21, which forms a pipe or tube. Thus, water from the mechanical mixing valve 100 flows in an outer portion of the spout 20, whereas water from the mechanical selector valve 200 flows in an inner portion of the spout 20. In other embodiments, however, the water channels 160, 260 need not be coaxial, and could, for example be formed by two pipes which run next to one another along the spout 20. The spout 20 may be disengageable from the other components from the tap body 10 such that it can be replaced by a different spout also having first and second channels and also to facilitate assembly and installation.

In one embodiment, the tap body 10 is fixable or attachable to a surface, such as a work surface of a kitchen, a surface of a sink, etc. Advantageously, the tap body 10 is arranged such that, when the tap body 10 is installed on the surface, the mechanical mixing valve 100, the mechanical selector valve 200 and the spout 20 including the first and second tap body outlets 140c, 240c are all located on the same side of the surface, which in practice is typically an uppermost surface. By locating the entirety of the mechanical mixing and mechanical selector valves 100, 200 in particular on the same (uppermost) side of the surface as the first and second tap body outlets 140c, 240c, the user has easy access to the valves 100, 200. This simplifies installation of the tap body 10 and is also useful in the event that the valves 200, 300 need to be repaired or maintained or replaced even.

In one embodiment all components of the tap body 10 are mechanical. This has the advantage that no electrical components or electronics or the like need to be installed when the tap body 10 is first installed onto a surface, making installation and maintenance easier, as an electrician is not required to install the tap body 10 and no wiring to electrical components or electronics or the like is required.

In one embodiment, the water tap body 10 comprises a first tap body part 10a, and a partially hollow generally cylindrical second tap body part 10b which are separable components of the water tap body 10, as shown in FIGS. 5 to 9 in particular. The first tap body part 10a is configured to receive the mechanical mixing valve 100 at a first hollow generally cylindrical end 180 and to receive the mechanical selector valve 200 at a second, opposed hollow generally cylindrical end 280. The second tap body part 10b is connectable to the first tap body part 10a such that the top surface 11a of the first tap body part 10a meets with the bottom surface 11b of the second tap body part 10b. The second tap body part 10b is further connectable to the spout 20 (see e.g., FIG. 4). In the example shown, the connection from the second tap body part 10b to the spout 20 is via a hollow generally cylindrical spout inlet 10c, which seats in an uppermost part of the second tap body part 10b, as will be described in more detail below.

Figure 6:
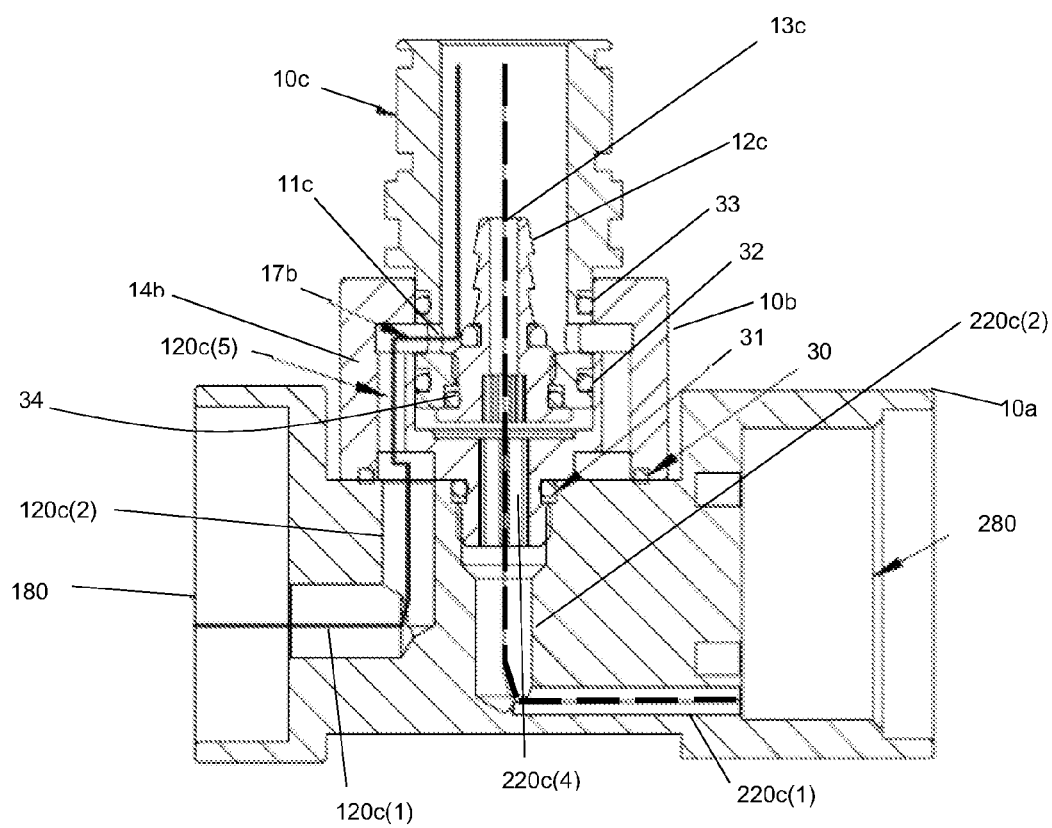
FIG. 6 shows a longitudinal cross-sectional view of the first and second tap body parts of FIG. 5 when assembled.

FIG. 6 shows a cross-section through exemplary first and second tap body parts 10a, 10b and spout inlet 10c when the first tap body part 10a is connected to the second tap body part 10b. The first tap body part 10a comprises first, second, third and fourth tap body inlets, which as discussed above may be connected to respective first, second, third and fourth water sources. Two of these water inlets are shown at 140b and 240b in FIG. 7, with the other water inlets being behind these water inlets 140b, 240b in the drawing. The first tap body part 10a also comprises first and second mixable water inlet channels and first and second selectable water inlet channels. One of the mixable water inlet channels is shown in phantom at 120b of FIG. 7, and one of the selectable water inlet channels is shown in phantom at 220b of FIG. 7, with the other water inlet channels (i.e. the water inlet channels 120a and 220a, which can be seen in FIGS. 1 and 2 respectively) being behind these water inlet channels 120b, 220b in the drawing.

When the mechanical mixing valve 100 is received within the first end 180 of the first tap body part 10a, the first and second water inlets 110a, 110b (see e.g. FIG. 1) of the mechanical mixing valve 100 align with outlets of the first and second mixable water inlet channels such that the first mixable water inlet channel 120c (see e.g. FIG. 1) routes water from the first tap body inlet to the first water inlet 110a of the mechanical mixing valve 100 and the second mixable water inlet channel 120b routes water from the second tap body inlet 140b to the second water inlet 110b of the mechanical mixing valve 100. Similarly, when the mechanical selector valve 200 is received within the second end 280 of the first tap body part 10a, the first and second water inlets 210a, 210b (see e.g. FIG. 2) of the mechanical selector valve 200 align with outlets of the first and second selectable water inlet channels 220a, 220b such that the first selectable water inlet channel 220a (see e.g. FIG. 2) routes water from the third tap body inlet to the first water inlet 210a of the mechanical selector valve 200 and the second selectable water inlet channel 220b routes water from the fourth tap body inlet 240b to the second water inlet 210b of the mechanical selector valve 200.

Referring again to FIG. 6, the first tap body part 10a also comprises a portion of the above-described mixed water outlet channel 120c and a portion of the above-described selected water outlet channel 220c. The portion of the mixed water outlet channel 120c is in one example formed of two channels formed at approximately 90° to each other, the first 120c(1) extending from the first end 180 and the second 120c(2) extending from the top surface 11a of the first tap body part 10a, and forming mixed water outlet 120c(3) (see FIG. 5). In an embodiment, the first tap body part 10a is initially formed as a solid cast or molded component and these channels 120c(1), 120c(2) are conveniently formed in one example by drilling. These two channels or drill holes 120c(1), 120c(2) meet such that water flows from the first drill hole to the second drill hole. Similarly, the selected water outlet channel 220c is also formed of two drill holes 220c(1), 220c(2), the first 220c(1) extending from the second end 280 and the second 220c(2) extending from the top surface 11a of the first tap body part 10a. The two drill holes 220c(1), 220c(2) meet such that water flows from the first drill hole to the second drill hole.

When the mechanical mixing valve 100 is received within the first end 180 of the first tap body part 10a, the water outlet 110c of the mechanical mixing valve 100 aligns with an inlet of the mixed water outlet channel 110c such that water output from the water outlet 110c of the mechanical mixing valve 100 flows into the mixed water outlet channel 120c of the first tap body part 10a. Similarly, when the mechanical selector valve 200 is received within the second end 280 of the first tap body part 10a, the water outlet 210c of the mechanical selector valve 200 aligns with an inlet of the selected water outlet channel 220c such that water output from the water outlet 210c of the mechanical selector valve 200 flows into the selected water outlet channel 220c of the first tap body part 10a.

Figure 8:
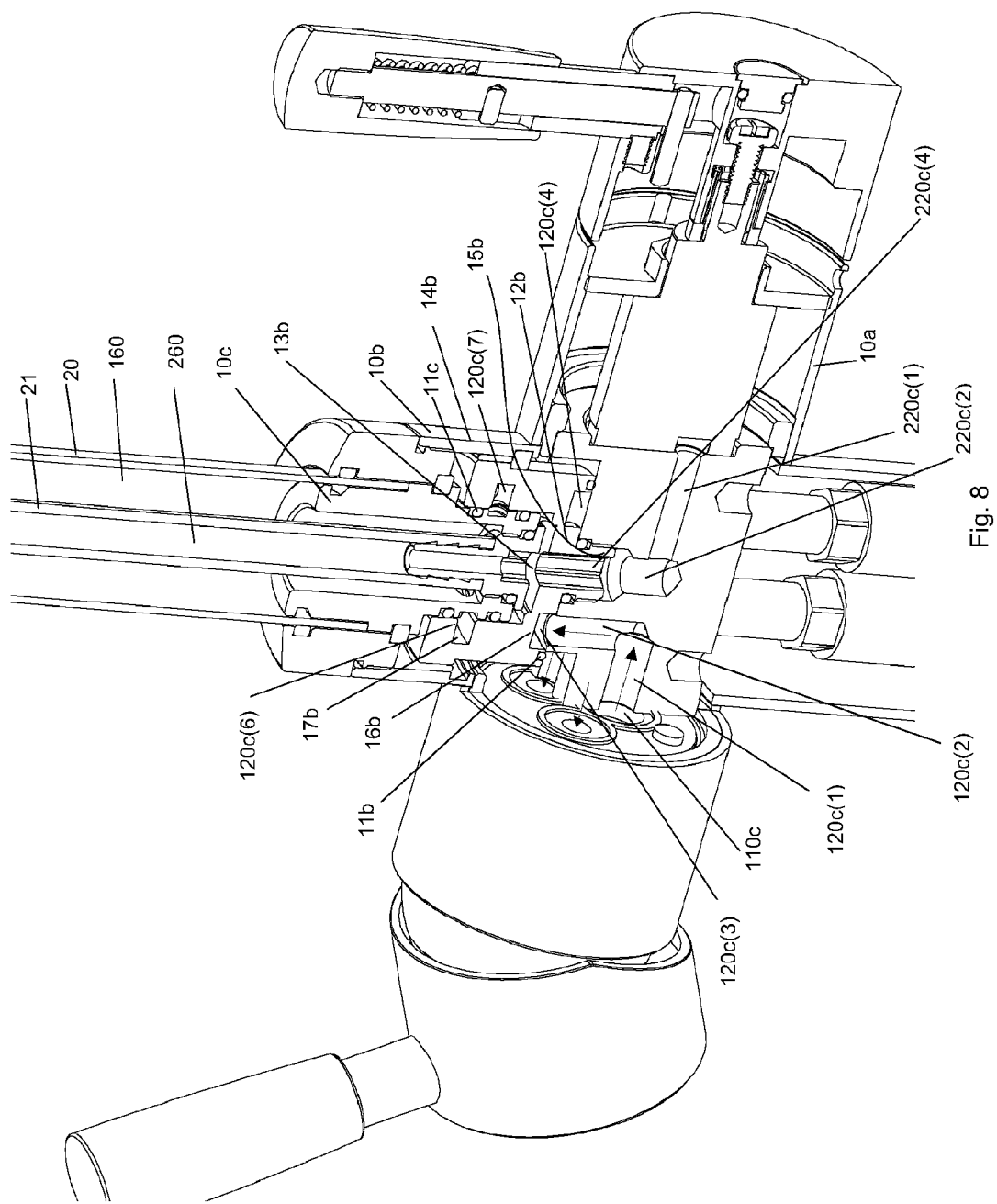
FIG. 8 shows again the partially sectioned/phantom perspective view from one side of the example of a water tap body of FIG. 1.

FIG. 8 shows a partially sectioned/phantom perspective view from a side of the water tap body, where the first and second tap body portions 10a and 10b and the outlet channels 120c(1), 120c(2), 220c(1), 220c(2) can again be seen. The second tap body part 10b comprises a generally disk-shape base portion 12b, having a lower surface 11b. When connected to the first tap body part 10a, the lower surface 11b of the base portion 12b of the second tap body part 10b meets with the upper surface 11a of the first tap body part 10a. The base portion 12b also comprises an upper surface 13b. Protruding upwardly from the upper surface 13b of the base portion 12b is a generally cylindrical collar portion 14b. The collar portion 14b is shaped to receive an end of the spout inlet 10c, as will be discussed in more detail below.

Protruding from the lower surface 11b of the base portion 12b of the second tap body part 10b is a generally cylindrical selected water inlet 15b. When the second tap body part 10b is connected to the first tap body part 10a, the selected water inlet 15b is received within an upper portion of the selected water outlet channel 220c(2) of the first tap body part 10a.

Also formed in the lower surface 11b of the second tap body part 10b is an annular recess 16b. When the second tap body part 10b is connected to the first tap body part 10a, the upper surface 11a of the first tap body 10a and the annular recess 16b form an annular channel 120c(4), which forms part of the mixed water outlet channel 120c, as will be described in more detail below.

Figure 7:
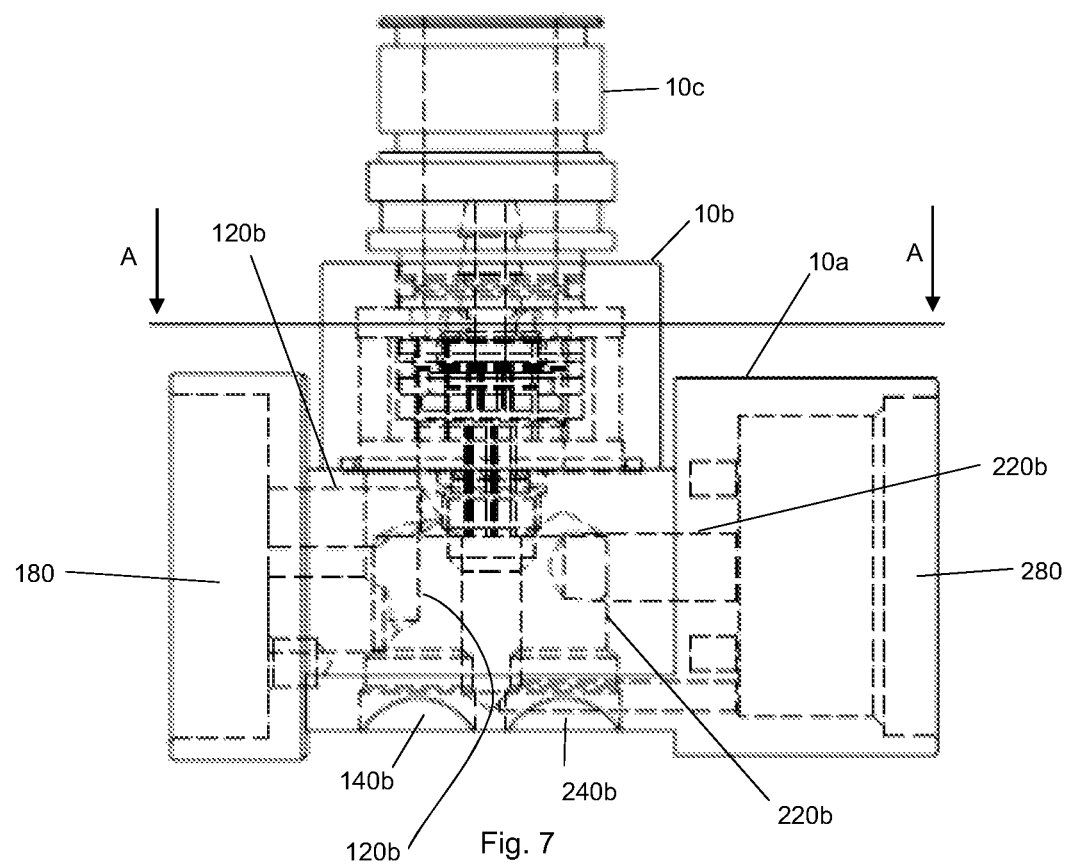
FIG. 7 shows a longitudinal cross-sectional view in phantom of the first and second tap body parts of FIG. 5 when assembled.
Figure 9:
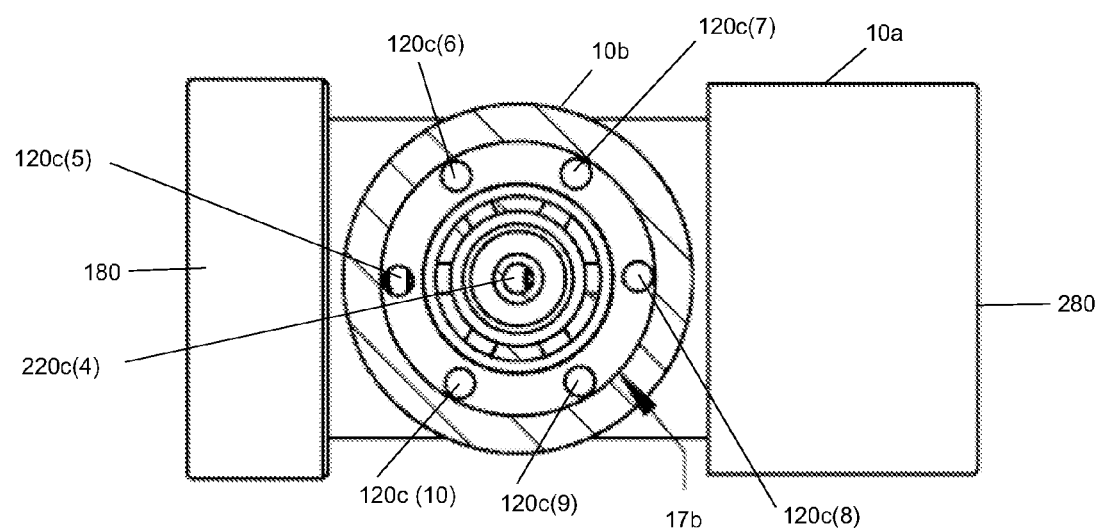
FIG. 9 shows a partial cross-sectional view on A-A of FIG. 7.

Referring to FIG. 9, which shows a cross-section on A-A of FIG. 7 through the second tap body part 10b when viewed from above, the second tap body part 10b also comprises six straight channels 120c(5) to 120c(10). Two of these straight channels can be seen in FIG. 8 at 120c(6) and 120c(7). The six straight channels 120c(5) to 120c(10) form part of the above-described mixed water outlet channel 120c.

Referring still to FIG. 9, the second tap body part 10b also comprises an annular recess 17b (see also FIG. 8) formed part way up and internally of the collar portion 14b of the second tap body part 10b. The annular recess 17b is arranged parallel to and in-line with the first annular recess 16b, and the straight channels 120c(5) to 120c(10) extend through the collar portion 14b from the first annular recess 16b to the second annular recess 17b.

Referring still to FIG. 9, the second tap body part 10b also comprises a channel 220c(4), which extends vertically from the bottom of the selected water inlet 15b to the upper surface 13b of the base portion 12b (see also FIG. 8). This channel 220c(4) forms a portion of the above-described selected water outlet channel 220c.

In one embodiment, the second tap body part 10b is initially formed as a solid cast or molded component comprising the base portion 12b, the collar portion 14b, the selected water inlet 15, and the first and second annular recesses 16b, 17b. In this case, the straight channels 120c(5) to 120c(10) are conveniently formed in one example by drilling from the first annular recess 16b to the second annular recess 17b. Similarly, the channel 220c(4) of the selected water outlet channel 220c can be formed by drilling from the bottom of the selected water inlet 15b to the upper surface 13b of the base portion 12b.

Referring to FIG. 8, when the first tap body part 10a is connected to the second tap body part 10b, water flowing from the water outlet 110c of the mechanical mixing valve 100 flows along the mixed water outlet channels 120c(1), 120c(2) of the first tap body part 10a and out of the mixed water outlet 120c(3) of the first tap body part 10a. The water then flows around the first annular channel 120c(4) formed by the first annular recess 16b of the second tap body part 10b, and up the straight channels 120c(5) to 120c(10) to the second annular recess 17b of the second tap body part. Similarly, water flowing from the water outlet 220c of the mechanical selector valve 200 flows along the selected water outlet channels 220c(1), 220c(2) of the first tap body part 10a and into the selected water outlet channel 220c(4) of the second tap body part 10b. O-rings, such as the O-rings 30 and 31 depicted in FIG. 6, may be fitted between the first tap body part 10a and the second tap body part 10b to prevent water from leaking out of the tap body 10 when it passes from the first tap body part 10a to the second tap body part 10b.

As mentioned above, the second tap body part 10b may, in some embodiments, be connectable to a spout 20 via a spout inlet 10c. As can be seen in FIG. 6, the spout inlet 10c is received within the collar portion 14b of the second tap body portion 10b, with the connection being sealed by O-rings 32 and 33. The spout 20 couples to the outside of the spout inlet 10c, as shown in FIG. 8, the connection being sealed by one or more further O-rings. The spout inlet 10c is hollow and comprises a generally cylindrical wall. The spout inlet 10c also comprises at least one radial through hole 11c, which extends through the cylindrical wall. When the spout inlet 10c is received within the second tap body part 10b, water flowing from the straight channels 120c(5) to 120c(10) and into the second annular recess 17b flows through the through hole 11c of the spout inlet 10c, up the spout inlet 10c and into the spout 20. Similarly, water flowing from the selected water outlet channel 220c(4) of the second tap body part 10b also flows up the spout inlet 10c and into the spout 20.

As mentioned above in relation to FIG. 4, the spout 20 may, in some embodiments, comprise two coaxial channels 160, 260. In this case, the spout inlet 10c may comprise an inner-spout inlet portion 12c. The inner-spout inlet portion 12c is generally cylindrical and comprises an axial channel 13c extending from the bottom of the inner-spout inlet portion 12c to the top of the inner-spout inlet portion 12c. When the spout inlet 10c is connected to the second tap body part 10b, the selected water outlet channel 220c(4) of the second tap body part 10b is in fluid communication with the axial channel 13c of the inner-spout inlet portion 12c. The tubular wall 21 which separates the two coaxial channels 160, 260 of the spout 20 (see FIG. 4) is connected to the outside of the inner-spout inlet portion 12c. Thus, water flowing from the selected water outlet channel 220c(4) of the second tap body part 10b flows up the axial channel 13c of the inner-spout inlet portion 12c and into the inner channel 260 of the spout 20.

In one embodiment, the inner-spout inlet portion 12c may be formed separately from the rest of the spout inlet 10c. In this case the connection between the inner-spout inlet portion 12c and the rest of the spout inlet 10c may be sealed by an O-ring, such as the O-ring 34 (see FIG. 6).

By constructing the tap body 10 from (at least) two tap body parts 10a, 10b, as described above, the various inlet and outlet channels for routing water from the tap body inlets to the water inlets 120a, 120b, 220a, 220b of the valves 100, 200, and for routing water from the water outlets 120c, 220c of the valves 100, 200 to the first and second tap body outlets 140c, 240c can be formed easily and straightforwardly from a number of (straight) drill holes. This makes manufacture of the tap body 10 relatively easy and efficient, and enables the relatively complex and sophisticated arrangement of the tap body 10, with its various water channels, and water inlets and outlets, etc., to be achieved. This is in contrast to prior art arrangements, where the whole tap body is typically a single item, which is cast or molded as a block.

Referring now to FIGS. 10 to 13, there is shown an exploded perspective view of some components of an exemplary water tap. The water tap comprises a tap body 300. The tap body 300 may be the tap body 10 described above, or an alternative tap body, which comprises different components from those described above. In any event, the water tap of FIGS. 10 to 13 also comprises an operating arm 400 rotatable relative to the tap body 300, as shown by the curved arrows in FIG. 11.

A valve 500 is engaged by the operating arm 400 to be rotatable relative to the tap body 300 between at least three rotational positions. In some arrangements all components of the valve 500 may rotate relative to the tap body 300, and in other arrangements, only some components of the valve 500 may rotate, while other components of the valve 500 remain fixed relative to the tap body 300. In any event, in a first rotational position, the valve 500 prevents water flowing through the valve 500; in a second rotational position, the valve 500 permits water to flow from a first water inlet through the valve 500; and in a third rotational position, the valve 500 permits water to flow from a second water inlet through the valve 500. The valve 500 may, in one embodiment, be a mechanical selector valve, such as the mechanical selector valve 200 of the examples of FIGS. 1 to 3 described above. In this case, the first water inlet may correspond to the first inlet 210a of FIG. 2 and the second inlet may correspond to the second inlet 210b of FIG. 2.

The water tap may, in one arrangement comprise a spout, and the valve 500 may be in fluid communication with the spout such that the valve 500 is operable to control the output of water from the spout.

Figure 10:
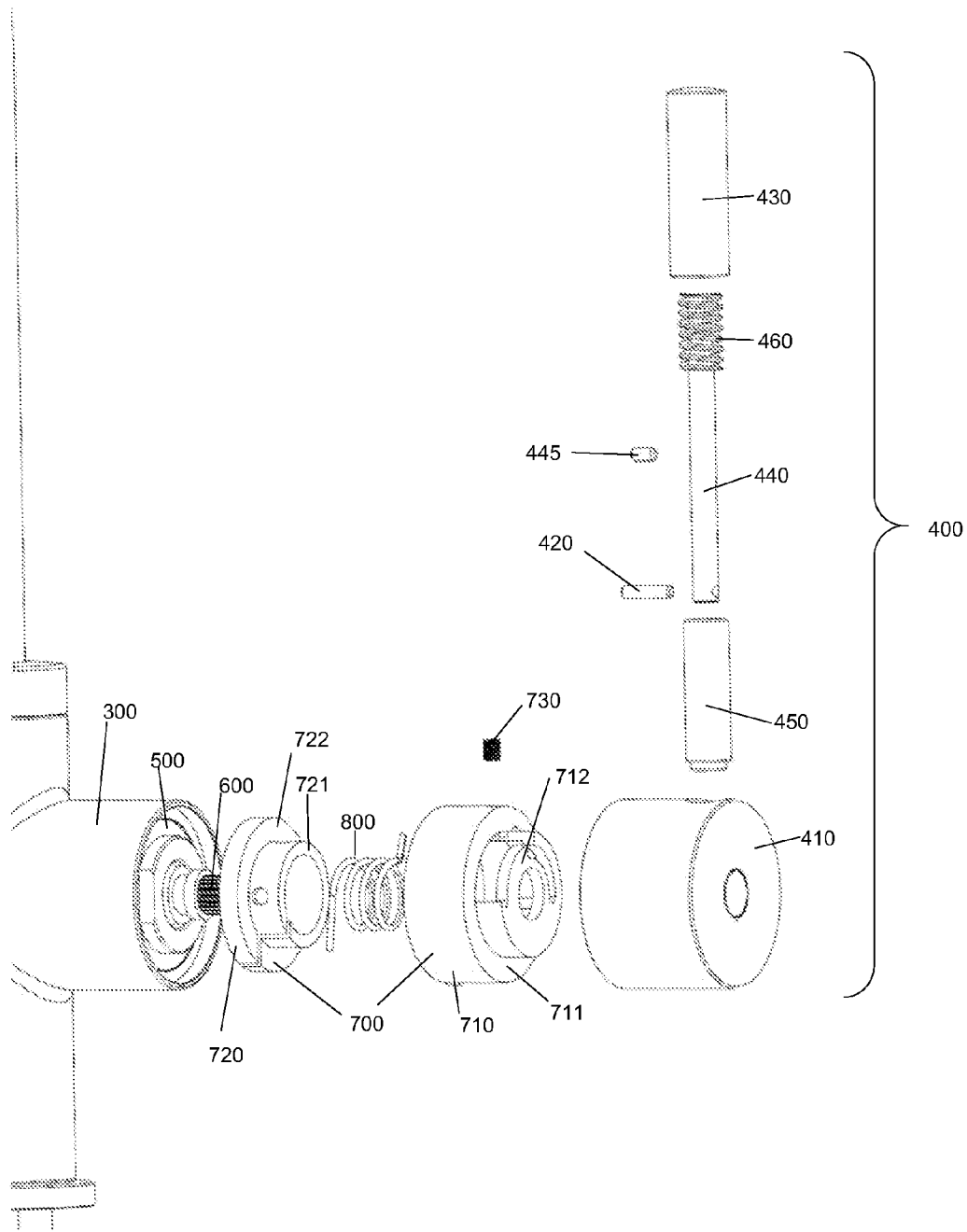
FIG. 10 shows an exploded perspective view of components of an example of a water tap body according to an embodiment of the present invention.

In the particular arrangement depicted in FIG. 10, the valve 500 is engaged by the operating arm 400 via a toothed stem 600 coupled to the valve 500 such that rotation of the toothed stem 600 causes rotation of the valve 500. The arm 400 comprises a cup-shape engagement end 410, which engages with the toothed stem 600, e.g. via teeth within the engagement end 410, such that rotation of the arm 400 causes rotation of the toothed stem 600 and thus rotation of the valve 500.

The water tap also comprises a cartridge 700 having a biasing member 800 retained therein. In the particular example shown in FIG. 10, the cartridge 700 comprises a first cartridge portion 710 and a second cartridge portion 720, which, when assembled, are locked together using a screw 730.

The first cartridge portion 710 comprises an outer cylindrical collar 711, and a front wall 712, which protrudes axially from the cylindrical collar 711. The second cartridge portion 720 comprises an inner cylindrical collar 721 which protrudes axially from a rear wall 722.

When assembled, the cartridge 700 and the biasing member 800 form an integral component which is installable in and removable from the water tap as a whole, separately from the other components of the water tap.

A biasing member, such as the biasing member 800, will typically have a relatively short lifespan due to the tensioning forces applied to the biasing member during operation. Thus, by forming the cartridge 700 and the biasing member 800 as an integral component, the cartridge 700 with the biasing member 800 can be easily replaced when the biasing member 800 reaches the end of its lifespan.

Figure 13:
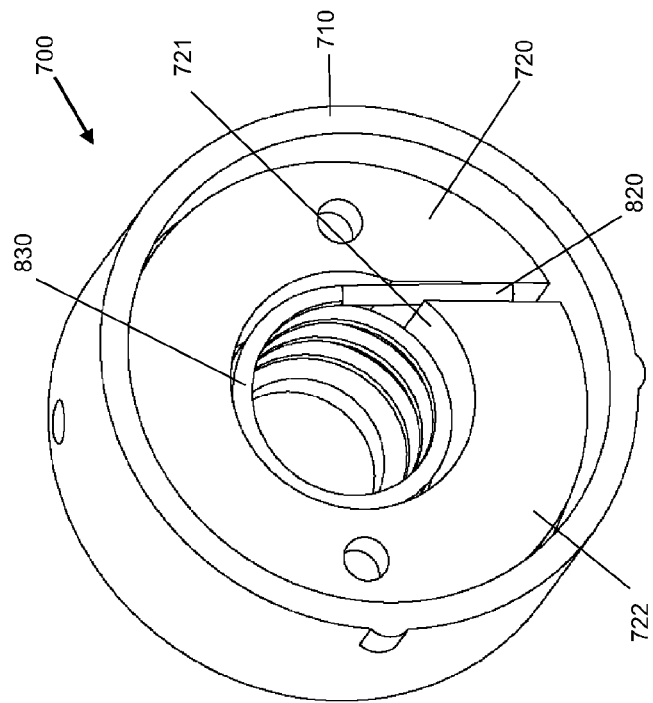
FIG. 13 shows a rear perspective view of the cartridge of FIG. 12.
Figure 12:
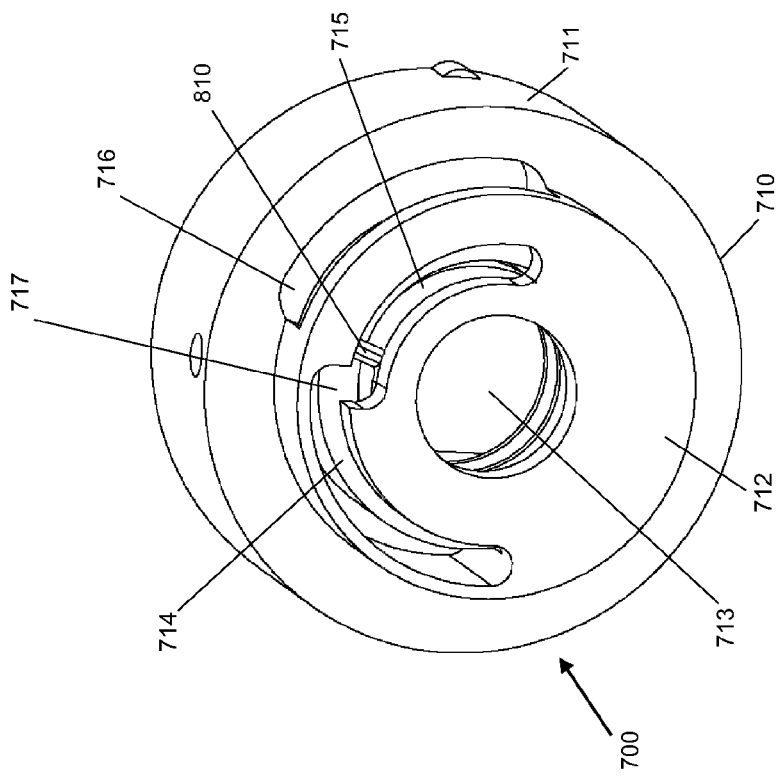
FIG. 12 shows a front perspective view of an example of a cartridge for use in a tap body.

The particular exemplary cartridge 700 of FIG. 10 is shown in assembled form in FIGS. 12 and 13. FIG. 12 shows a front view of the cartridge 700, and FIG. 13 shows a rear view of cartridge 700. As can be seen, the second cartridge portion 720 is received within the outer collar 711 of the first cartridge portion 710. The front wall 712 of the first cartridge portion 710 comprises a through hole 713 which is coaxial with the inner collar 721 of the second cartridge portion 720. When assembled within the water tap, the toothed stem 600 (see FIG. 10) passes through the hole 713 in the first cartridge portion 710 and through the inner collar 721 of the second cartridge portion 720 and engages with the engagement end 410 of the operating arm 400.

In the examples shown in FIGS. 10 to 13, the biasing member 800 is a coil spring which comprises a first leg 810, a second leg 820 and a coil portion 830 (see FIGS. 12 and 13). The coil portion 830 is received within the inner collar 721 of the second cartridge portion 710. The first leg 810 is movable relative to the cartridge 700, and the second leg 820 is held in a fixed position by a slot 723 of the second cartridge portion 720.

The arrangement of the operating arm 400, the valve 500, the cartridge 700 and the biasing member 800 is such that the operating arm 400 is freely movable between the first and second positions. On movement of the operating arm 400 from the first position to the third position, on the other hand, the operating arm 400 is biased by the biasing member 800 to the first position. Thus, in order to allow water from the second water inlet to flow through the valve 500, a user must apply a constant rotational force to the operating arm 400 to maintain the operating arm 400 in the third position. If the user releases the operating arm 400, the arm 400 is returned to the first position, thereby stopping the flow of water from the second water inlet through the valve 500.

Such an arrangement is particularly advantageous where the first water inlet of the valve 500 is coupled to a cold water source and the second water inlet of the valve 500 is coupled to a hot water source. In this case, cold water is permitted to flow through the valve 500 upon rotation of the operating arm 400 from the first position to the second position. As no biasing force is exerted on the operating arm 400 when the operating arm is in the second position, the operating arm 400 will remain in the second position, thereby allowing a continuous flow of cold water through the valve 500, until the operating arm 400 is rotated back to the first position. This may be useful, for example, where a user of the water tap wishes to draw a large volume of cold water from the water tap, for example to fill a sink or bucket. In this case, the user can walk away and leave the tap running until the desired amount of water has been drawn.

On the other hand, upon rotation of the operating arm 400 from the first position to the third position, hot water is permitted to flow through the valve 500. However, in this case, because the operating arm 400 is biased by the biasing member 800 towards the first position, the user must apply a continuous force on the operating arm 400 in order to maintain the operating arm 400 in the third position and thereby maintain the flow of hot water through the valve 500. If the user releases the operating arm 400, the arm 400 will return to the first position, thereby quickly stopping the flow of hot water through the valve 500.

In one arrangement, the biasing member 800 is retained within the cartridge 700 in a pre-tensioned state, which means the cartridge 700 applies a tensioning force to the biasing member 800. The biasing member 800 may be tensioned so as to increase the biasing force applied to the operating arm 400 when the operating arm 400 is rotated towards the third position.

In the example arrangement depicted in FIGS. 10 to 13, the cartridge 700 applies a force to the first leg 810 of the biasing member 800 and thereby holds the first leg 810 in a "tensioned position" in which it is deflected from a "relaxed position". The "relaxed position" is a position in which the first leg 810 would reside, were no force to be applied to the first leg 810. In FIG. 12, the first leg 810 is shown in the tensioned position, with the relaxed position being in the anti-clockwise direction. The first leg 810 is held in the tensioned position by an internal retaining means 716 of the cartridge 700, which abuts the left hand side of the first leg 810 when viewed from the perspective shown in FIG. 12. The retaining means 716 may be, for example a lip or shelf formed within the cartridge 700.

The cartridge 700 may advantageously allow movement of the first leg 810 in a direction in which it is further deflected from the relaxed position (in FIG. 12, the first leg 810 is allowed to move in the clockwise direction), but may prevent movement of the first leg 810 in which deflection from the relaxed position is reduced as compared to the tensioned position (in FIG. 12, the first leg 810 is prevented from moving in the anti-clockwise direction beyond the tensioned position by the retaining means 716). The greater the deflection of the first leg 810 from the relaxed position, the greater the biasing torque applied to a component that is engaged with the biasing member 800. Thus, by pre-tensioning the biasing member 800, the biasing force applied to the operating arm 400 when it first engages with the biasing member 800 (as will be discussed further below) is greater.

Additionally, by retaining the biasing member 800 in the cartridge 700 in a pre-tensioned state, installation of the biasing member 800 within the water tap is made easier, as the person installing the biasing member 800 is not required to apply any tensioning forces to the biasing member 800 when installing the biasing member 800 into the water tap.

Additionally, by retaining the biasing member 800 in the cartridge 700, the biasing means 800 does not need to be coupled to the valve 500, as is the case in some prior art valve mechanisms. Thus, any conventional rotational valve can be used; there is no requirement for a special valve which comprises means for coupling the valve to the biasing means 800 to be included in the water tap.

In the arrangement shown in FIGS. 10 to 13, the operating arm 400 comprises a pin 420 which projects generally perpendicularly away from the length of the operating arm 400 (see FIG. 10), and the first cartridge portion 710 comprises a first arcuate slot 714 (see FIG. 12). The biasing member 800 is held within the cartridge 700 such that the pin 420 moves freely within the first arcuate slot 714 when the operating arm 400 is moved between the first position and the second position. In other words, the biasing member 800 is held within the cartridge 700 such that the pin 420 does not engage the biasing member 800 when the operating arm 400 is moved between the first position and the second position.

When the operating arm 400 is in the first position, the pin 420 is located in the first arcuate slot 714, at the left hand side of the first leg 810. Rotation of the operating arm 400 towards the second position causes the pin 420 to move in the anti-clockwise direction along the first arcuate slot 714 and away from the first leg 810, which is retained in its tensioned position, as discussed above.

The cartridge comprises a second arcuate slot 715 and the biasing member 800 is held within the cartridge 700 such that the pin 420 moves within the second arcuate slot 715 against the action of the biasing member 800 when the operating arm 400 is moved between the first position and the third position.

As mentioned, when the operating arm 400 is in the first position, the pin 420 is located in the first arcuate slot 714, at the left hand side of the first leg 810. Rotation of the operating arm 400 towards the third position causes the pin 420 to move in the clockwise direction along the second arcuate slot 715. As the pin 420 moves along the second arcuate slot 715, the pin 420 displaces the first leg 810 away from the tensioned position, and towards a position whereby the first leg 810 is further displaced from its equilibrium position. Thus, the first leg 810 applies a force to the pin 420, which acts to return the pin 420 to the first position when the operating arm 400 is released.

Figure 11:
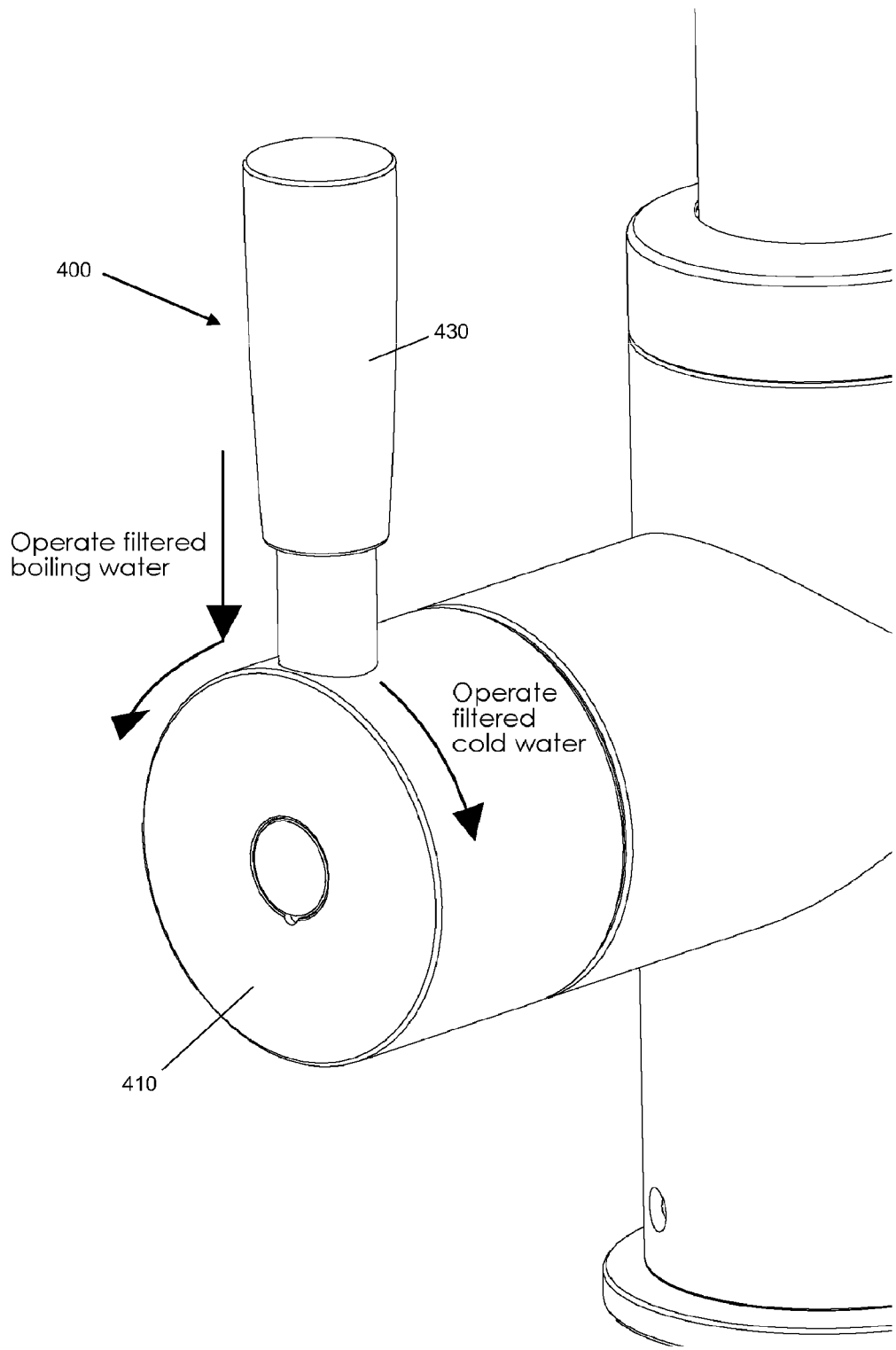
FIG. 11 shows a perspective view of a portion of an example of a water tap body according to an embodiment of the present invention to illustrate operation of an operating arm.

In one embodiment, the operating arm 400 comprises a handle 430 which is movable in a radial direction relative to the axis of rotation of the operating arm 400 that is parallel to the length of the operating arm 400, as shown by the straight arrow in FIG. 11. As shown in FIG. 12 for example, the first arcuate slot 714 is radially outward of the second arcuate slot 715. The handle 430 of the operating arm 400 is coupled to the pin 420 such that the pin 420 only engages the second arcuate slot 715 when the handle 430 has been moved radially inwards. Thus, in order to allow water from the second water inlet to flow through the valve 500, a user must first push the handle 430 radially inwards, in order to engage the pin 420 with the second arcuate slot 715. Once the pin 420 is engaged with the second arcuate slot 715, the user is able to rotate the operating arm 400 towards the third position. Such an arrangement forms a useful "child-proofing" mechanism which makes it more difficult to cause water from the second source to flow through the water tap. Such a child-proofing mechanism may be desirable, for example, where the second water inlet is connected to a hot water source.

Again, if the user releases the operating arm 400 when the arm is in the third position, the arm 400 is returned to the first position under the action of the biasing member 800, thereby stopping the flow of water from the second water inlet through the valve 500. In one embodiment, the handle 430 of the operating arm 400 is biased in a radially outward direction towards a position in which the pin 420 is caused to be disengaged from the second arcuate slot 715. Thus, when the user releases the operating arm 400, and the arm 400 has been returned back to the first position, the pin 420 is disengaged from the second arcuate slot 715. In this case, in order to permit water to flow from the second water inlet through the valve 500, the user must again push the handle 430 radially inwards before turning the operating arm 400 to the third position.

In the embodiment shown in FIGS. 10 to 13, the handle 430 is coupled to the pin 420 via a post 440, which is connected to the handle 430 at its upper end, and is connected, to the pin 420 at its lower end (see FIG. 4 which shows the operating arm 400 installed on the tap body 10 of FIG. 4 and coupled to a mechanical selector valve 200). The post 440 is moveable within a collar 450. Thus, movement of the handle 430 in a radial direction causes movement of post 440 and the pin 420 in the radial direction.

The handle 430 is biased radially outward by a coil compression spring 460, which abuts against collar 450 and an inner surface of the handle 430 (see FIG. 4). When the handle 430 is moved radially inward, therefore, the spring 460 is compressed and a biasing force is applied to the handle 430 in the radially outward direction.

The post 440 comprises a stopper pin 445 which is received within a slot 455 of the collar 450. The stopper pin 445 moves within the slot 455 when the handle 430 is moved in a radial direction. The slot 455 and stopper pin 445 act to restrict the range of radial movement of the handle 430 and therefore the pin 420.

As noted, in one embodiment the first arcuate slot 714 is radially outward from the second arcuate slot 715, and the first and second slots 714, 715 are connected by a radial slot 717. When the operating arm 400 is installed in the water tap, together with the cartridge 700, the pin 420 is biased by the spring 460 toward the first arcuate slot 714. Thus, when no force is applied to the operating arm 400, the pin 420 resides within the first (outer) arcuate slot 714, and the arm 400 is positioned somewhere between the first position and the second position. In order to cause the arm 400 to rotate to the third position, the arm 400 must first be rotated to the first position (if it is not in that position already) so that the pin 420 is located above the radial slot 717 joining the first and second arcuate slots 714, 715. Then the handle 430 must be moved in the radially inward direction, to move the pin 420 into the second (inner) arcuate slot 715. Once the pin 420 is fully within the second arcuate slot 715, the arm 400 can be moved to the third position, thereby causing water from the second source to flow through the valve 500.

Figure 14:
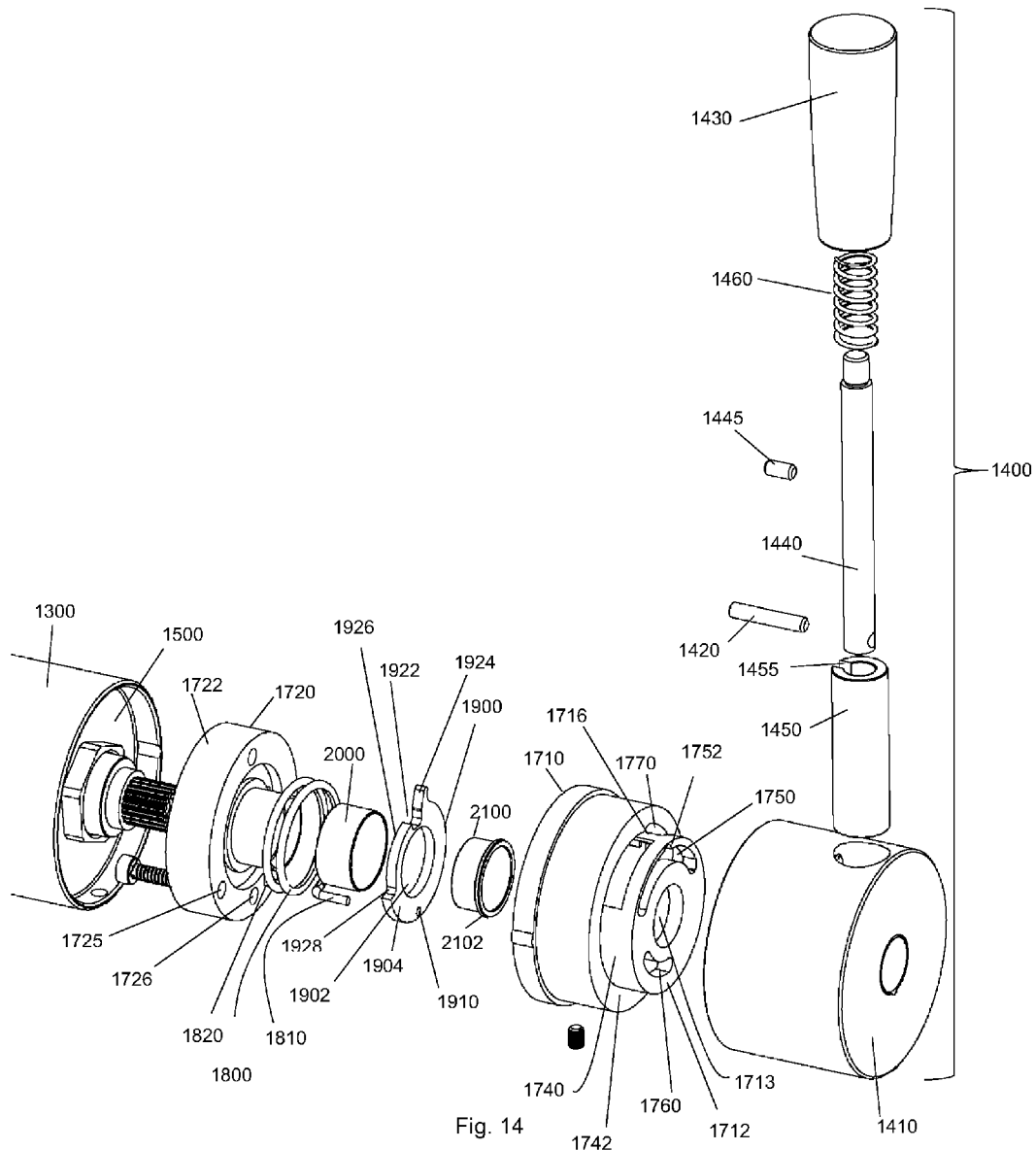
FIG. 14 shows an exploded perspective view of components of another example of a water tap body according to an embodiment of the present invention.
Figure 16:
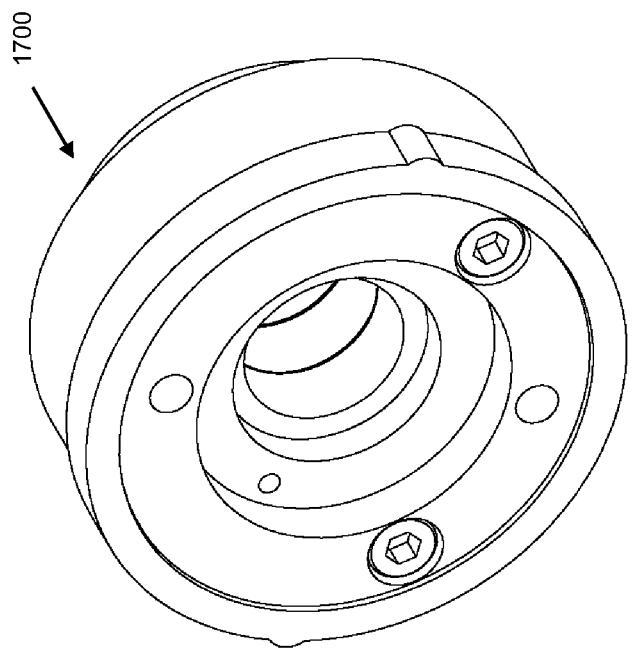
FIG. 16 shows a rear perspective view of the cartridge of FIG. 15.
Figure 15:
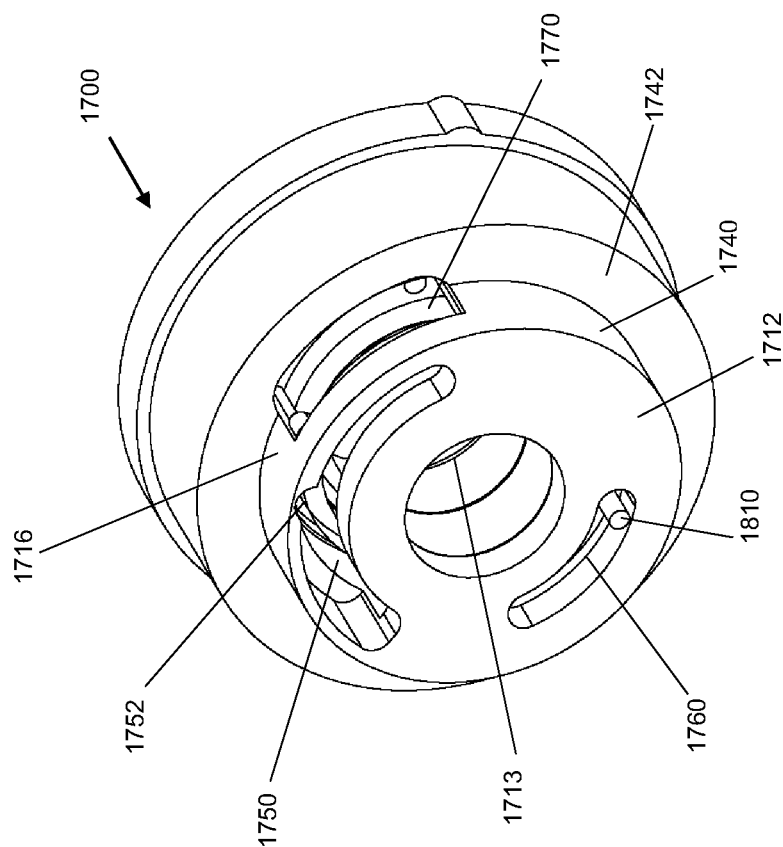
FIG. 15 shows a front perspective view of another example of a cartridge for use in a tap body.

Referring now to FIGS. 14 to 16, there is shown another example of some components of an exemplary water tap. In the following description and in FIGS. 14 to 16, components and features that are the same as or similar to the corresponding components and features of the example described above and with particular reference to FIGS. 10 to 13 have the same reference numeral but increased by 1000. For the sake of brevity, the description of those components and features will not be repeated in its entirety. It will be understood that the arrangements and alternatives, etc. described above in relation to the example of FIGS. 10 to 13 are also applicable to the example of FIGS. 14 to 16.

Again, in broad outline, the operating arm 1400 of FIG. 14 is rotatable relative to the tap body 1300 to control the flow of water through valve 1500, with the handle 1430 of the arm 1400 being depressed or moved radially inwards to permit flow of for example hot or boiling water. The principal differences in this example compared to the example described above is that instead of the first leg 810 of the coil spring 800 being received in one of two radially displaced arcuate slots 714, 715 in the first cartridge portion 710 and the pin 420 on the operating arm 400 engaging the first leg 810 directly, in this example there is an intermediate drive wheel 1900 between the pin 1420 on the operating arm 1400 and the biasing member 1800. The drive wheel 1900 receives a first leg 1810 of the coil spring 1800 and also engages with the pin 1420 on the operating arm 1400 when the operating arm 1400 is rotated. An advantage of the example shown in FIGS. 14 to 16 is that the fitting can be more secure as the pin 1420 on the operating arm 1400 does not directly engage the first leg 1810 of the coil spring 1800.

In the example shown in FIGS. 14 to 16, the first cartridge portion 1710 has a first arcuate slot 1750 on the front wall 1712. The first arcuate slot 1750 has a detent 1752 at the crest of the arcuate slot 1750. When the operating arm 1400 is not in use the pin 1420 is biased to rest in the detent 1752 by the action of the compression spring 1460. To move the pin 1420, the handle 1430 of the operating arm 1400 is depressed so that the pin 1420 exits the detent 1752. The handle 1430 may then be rotated in either clockwise or anticlockwise direction and the pin 1420 will slide along the first arcuate slot 1750.

The first cartridge portion 1710 has a second arcuate slot 1760 for receiving the first leg 1810 of the biasing member 1800. The second arcuate slot 1760 in this example is also arranged on the front wall 1712 of the first cartridge portion 1710, generally opposite the first arcuate slot 1750. The first cartridge portion 1710 has a third arcuate slot 1770 for receiving a projection 1924 of a drive wheel 1900. The third arcuate slot 1770 is arranged in the side wall 1740 at a position where the side wall 1740 and the front facing wall 1742 of the first cartridge portion 1710 abut. The side wall 1740 is joined to the front wall 1712. The third arcuate slot 1770 in the example shown is arranged near the first arcuate slot 1750 and away from the second arcuate slot 1760.

The second cartridge portion 1720 shown in FIG. 14 has at least one aperture for receiving a second leg 1820 of the biasing member 1800. The second cartridge portion 1720 has an inner cylindrical collar 1721 which protrudes axially away from the rear wall 1722. In this example the inner cylindrical collar 1721 has a smaller radius than the biasing member 1800 and the biasing member 1800 fits over the inner cylindrical collar 1721.

The biasing member 1800 shown in FIG. 14 is a coil spring which comprises a first leg 1810, a second leg 1820 and a coil portion 1830 as previously described. The first leg 1810 and second leg 1820 project axially from the coil portion 1830 in a direction parallel to the central longitudinal axis of the coil portion 1830. The first leg 1810 projects towards the first cartridge portion 1710. The first leg 1810 is received in and projects through an aperture 1910 in the drive wheel 1900. The end of the first leg 1810 is received in the third arcuate slot 1719 in the first cartridge portion 1710. The second leg 1820 of the coil spring 1800 projects away from the first cartridge portion 1710. The second leg 1820 is received in an aperture 1725 in the second cartridge portion 1720. The coil portion 1830 of the coil spring 1800 is arranged around the inner cylindrical collar 1721.

In the example shown the second leg 1820 of the coil spring 1800 is received in one of two apertures 1725, 1726. Changing the aperture in which the second leg 1820 of the biasing member 1800 is received allows the tension of the biasing member 1800 to be adjusted. For example, the tension of the biasing member 1800 may degrade over time, or different biasing members 1800 may be manufactured with different inherent spring strengths, and so having a choice of aperture 1725, 1726 in which the second leg 1820 is received, the correct or optimum tension can be set or restored.

When the tension of the biasing member 1800 is increased, the radius of the coil portion 1830 tends to decrease. To prevent the biasing member 1800 from damaging the inner cylindrical collar 1721 about which the biasing member 1800 is arranged, a protective member 2000 can be positioned between the biasing member 1800 and the inner cylindrical collar 1721. The protective member 2000 is an elongate ring with a diameter less than that of the inner diameter of the biasing member 1800 but greater than the diameter of the inner cylindrical collar 1721. The protective member 2000 is of a similar length to the inner cylindrical collar 1721 to ensure the inner cylindrical collar 1721 is protected from the biasing member 1800. The protective member 2000 can be made of a resilient material such as plastics or rubber for example.

The drive wheel 1900 is generally disk-shape or ring-shape and is arranged between the biasing member 1800 and the first cartridge portion 1710. The drive wheel 1900 has a central aperture 1902 in which a tubular retainer 2100 is received for retaining the drive wheel 1900 in proximity with the biasing member 1800. The drive wheel 1900 has an aperture 1910 through the main ring-like body portion 1904 of the drive wheel 1900 for receiving the first leg 1810 of the biasing member 1800. The aperture 1910 in the example shown is in a lower portion of the drive wheel 1900. The drive wheel 1900 has an annular recess portion 1926 of reduced radius extending around approximately 90°. The annular recess portion 1926 is bounded at one end by a stop 1928 and at the other end by the projecting leg 1924, with a detent or recess 1922 being located between the annular recess portion 1926 and the projecting leg 1924.

When the operating handle 1430 is depressed initially, the pin 1420 of the arm 1400 exits the detent 1752 of the first arcuate slot 1750 of the first cartridge portion but does not enter the recess 1922 of the drive wheel 1900. If the operating arm 1400 is turned anticlockwise from a first position to a second position, the pin 1420 can then slide around the annular recess portion 1926 without moving the drive wheel 1900 and thereby without acting against the biasing member 1800. The stop 1928 stops the pin 1420 sliding along the ridge 1926 when the handle 1430 has been fully turned. This is suitable for dispensing cold water. The flow of cold water can be maintained without the user holding the handle 1430 which is useful for a user wishing to obtain large volumes of water.

On the other hand, when the handle 1430 is fully depressed, the recess 1922 receives the pin 1420 of the operating arm 1400. The projecting leg 1924 projects through the third arcuate slot 1770 of the first cartridge portion 1710 and at rest abuts retaining means 1716 as a result of the torsion generated by the biasing member 1800. When the pin 1420 is received in the recess 1922, the handle 1430 can be rotated clockwise from a first position to a third position. The pin 1420 of the operating arm 1400 moves against the projecting leg 1924 of the drive wheel 1900. As the pin 1420 moves against the projecting leg 1924, the drive wheel 1900 rotates and the first leg 1810 of the coil spring 1800 moves in the second arcuate slot 1760 of the first cartridge portion 1710. The second leg 1820 of the coil spring 1800 is held stationary in the aperture 1725 in the second cartridge portion 1720 and as such the pin 1420 acts against the torsion generated by the coil spring 1800. As for the earlier example this requires the user to hold the handle 1430 in a third position to maintain the flow of water through the valve 1500. This safety feature, whereby when the user releases the handle 1430 the flow of water is ceased, is useful in the operation of a water tap which can provide for example boiling water.

As shown in the example, the retainer 2100 is arranged between the drive wheel 1900 and the first cartridge portion 1710. The retainer 2100 is an elongate ring with a diameter less than that of the central aperture 1902 of the drive wheel 1900. The retainer 2100 in the example shown has a lip 2102 at the end proximal to the first cartridge portion 1900. The retainer 2100 is axially aligned with the first cartridge portion. The lip 2102 of the retainer 2100 has a radius larger than that of the hole 1713 in the first cartridge portion 1710 such that the retainer 2100 is held within the cartridge 1700. The retainer 2100 enters both the central aperture 1902 of the drive wheel 1900 and the inner cylindrical collar 1721 so that the drive wheel 1900, biasing member 1800 and the first cartridge portion 1710 are axially aligned. The retainer 2100 increases the stability and therefore the reliability of the cartridge 1700.

The above embodiments are to be understood as illustrative examples of the invention. Further embodiments of the invention are envisaged. For example, one or both of the mechanical mixing valve 100 and mechanical selector valve 200 may provide for inlets and flow control for further inlet water supplies, in addition to the two inlet water supplies described above for each. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A tap body comprising:
   a mechanical mixing valve having a first water inlet, a second water inlet and a water outlet, the mechanical mixing valve being operable by a first manually operable lever selectively to allow water to flow only from the first water inlet of the mechanical mixing valve to the water outlet of the mechanical mixing valve, to allow water to flow only from the second water inlet of the mechanical mixing valve to the water outlet of the mechanical mixing valve, and to allow a mix of water to flow from the first water inlet of the mechanical mixing valve and the second water inlet of the mechanical mixing valve to the water outlet of the mechanical mixing valve;
   a mechanical selector valve having a first water inlet, a second water inlet and a water outlet, the mechanical selector valve being operable by a second manually operable lever selectively to allow water to flow only from the first water inlet of the mechanical selector valve to the water outlet of the mechanical selector valve and to allow water to flow only from the second water inlet of the mechanical selector valve to the water outlet of the mechanical selector valve at any one time;
   a first tap body outlet; and
   a second tap body outlet,
   wherein the water outlet of the mechanical mixing valve is in fluid communication with the first tap body outlet such that water passing out of the water outlet of the mechanical mixing valve passes to the first tap body outlet,
   wherein the water outlet of the mechanical selector valve is in fluid communication with the second tap body outlet such that water passing out of the water outlet of the mechanical selector valve passes to the second tap body outlet,
   wherein the mechanical selector valve is manually operable by the second manually operable lever to rotate between first, second and third positions, the second position and the third position each comprising a range of positions,
   wherein in the first position the mechanical selector valve is operable to prevent the flow of water from its first water inlet and its second water inlet to its water outlet, wherein in the second position the mechanical selector valve is operable to allow water to flow only from its first water inlet to its water outlet, and wherein in the third position the mechanical selector valve is operable to allow water to flow only from its second water inlet to its water outlet, and
   wherein the angle by which the mechanical selector valve is rotated, by the second manually operated lever, through the range of second positions or the range of third positions controls the amount of water allowed to flow to its water outlet.

2. A tap body according to claim 1, configured such that when the tap body is installed on a surface, the mechanical mixing valve, the mechanical selector valve and the first and second tap body outlets are all located on the same side of the surface.

3. A tap body according to claim 1, further comprising a first tap body part and a second tap body part, wherein the first and second tap body parts are separable components of the tap body, and wherein the first tap body part is connectable to the mechanical mixing valve, the mechanical selector valve and the second tap body part.

4. A tap body according to claim 3, wherein the first tap body part comprises first, second, third, and fourth tap body inlet channels, which route water from respective inlets of the tap body to the first and second water inlets of the mechanical mixing valve and the first and second water inlets of the mechanical selector valve respectively, and the second tap body part comprises first and second outlet channels which route water to the first and second tap body outlets respectively.

5. A tap body according to claim 4, wherein the first tap body part comprises first and second outlet channels, the first outlet channel of the first tap body part routing water from the water outlet of the mechanical mixing valve to the first outlet channel of the second tap body part, and the second outlet channel of the first tap body part routing water from the water outlet of the mechanical selector valve to the second outlet channel of the second tap body part.

6. A tap body according to claim 1, further comprising a spout, the spout having a first water channel having an inlet in fluid communication with the water outlet of the mechanical mixing valve, and the spout having a second water channel having an inlet in fluid communication with the water outlet of the mechanical selector valve.

7. A tap body according to claim 1, wherein the mechanical mixing valve is manually operable to allow a selectively variable amount of water to flow from the first water inlet and the second water inlet into the mechanical mixing valve to mix in the mechanical mixing valve.

8. A tap body according to claim 2, wherein the mechanical mixing valve is manually operable to allow a selectively variable amount of water to flow from the first water inlet and the second water inlet into the mechanical mixing valve to mix in the mechanical mixing valve.

9. An installation of a tap body in a surface, the tap body comprising:
  a mechanical mixing valve having a first water inlet, a second water inlet and a water outlet, the mechanical mixing valve being operable by a first manually operable lever selectively to allow water to flow only from the first water inlet of the mechanical mixing valve to the water outlet of the mechanical mixing valve, to allow water to flow only from the second water inlet of the mechanical mixing valve to the water outlet of the mechanical mixing valve, and to allow a mix of water to flow from the first water inlet of the mechanical mixing valve and the second water inlet of the mechanical mixing valve to the water outlet of the mechanical mixing valve;
  a mechanical selector valve having a first water inlet, a second water inlet and a water outlet, the mechanical selector valve being operable by a second manually operable lever selectively to allow water to flow only from the first water inlet of the mechanical selector valve to the water outlet of the mechanical selector valve and to allow water to flow only from the second water inlet of the mechanical selector valve to the water outlet of the mechanical selector valve at any one time; and
  a spout having a first water channel with an inlet in fluid communication with the water outlet of the mechanical mixing valve, the spout having a second water channel with an inlet in fluid communication with the water outlet of the mechanical selector valve;
wherein the mechanical mixing valve, the mechanical selector valve and the spout are all located on the same side of the surface,
wherein all components of the tap body are mechanical,
wherein the mechanical selector valve is manually operable by the second manually operable lever to rotate between first, second and third positions, the second position and the third position each comprising a range of positions,
wherein in the first position the mechanical selector valve is operable to prevent the flow of water from its first water inlet and its second water inlet to its water outlet, wherein in the second position the mechanical selector valve is operable to allow water to flow only from its first water inlet to its water outlet, and wherein in the third position the mechanical selector valve is operable to allow water to flow only from its second water inlet to its water outlet, and
wherein the angle by which the mechanical selector valve is rotated, by the second manually operated lever, through the range of second positions or the range of third positions controls the amount of water allowed to flow to its water outlet.

10. An installation according to claim 9, wherein the tap body comprises a first tap body part and a second tap body part, wherein the first and second tap body parts are separable components of the tap body, and wherein the first tap body part comprises first and second ports for receiving the mechanical mixing valve and the mechanical selector valve respectively, and wherein the first tap body part is connectable to the second tap body part.

11. An installation according to claim 10, wherein the first tap body part comprises first, second, third, and fourth tap body inlet channels, which route water from respective tap body inlets to the first and second water inlets of the mechanical mixing valve and the first and second water inlets of the mechanical selector valve respectively, and the second tap body part comprises first and second outlet channels which route water to the first and second water channels of the spout respectively.

12. An installation according to claim 11, wherein the first tap body part comprises first and second outlet channels, the first outlet channel of the first tap body part routing water from the water outlet of the mechanical mixing valve to the first outlet channel of the second tap body part, and the second outlet channel of the first tap body part routing water from the water outlet of the mechanical selector valve to the second outlet channel of the second tap body part.

13. An installation according to claim 9, wherein the mechanical mixing valve is manually operable to allow a selectively variable amount of water to flow from the first water inlet and the second water inlet into the mechanical mixing valve to mix in the mechanical mixing valve.

* * * * *